United States Patent
Tatro et al.

(10) Patent No.: US 8,103,571 B2
(45) Date of Patent: *Jan. 24, 2012

(54) METHOD AND SYSTEM FOR AN ENHANCED STEP-UP PROVISION IN A DEFERRED VARIABLE ANNUITY WITH A RISING GUARANTEED STEP-UP

(75) Inventors: Charles D. Tatro, Mendon, MA (US); David P. Wiland, Norristown, PA (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,877

(22) Filed: Oct. 6, 2010

(65) Prior Publication Data

US 2011/0066453 A1 Mar. 17, 2011

Related U.S. Application Data

(63) Continuation of application No. 11/983,512, filed on Nov. 9, 2007, now Pat. No. 7,848,989.

(60) Provisional application No. 60/961,797, filed on Jul. 24, 2007.

(51) Int. Cl.
*G06Q 40/00* (2006.01)

(52) U.S. Cl. .......................... 705/36 R; 705/35; 705/38

(58) Field of Classification Search ................ 705/35, 705/36 R, 36 T, 37
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,049,772 A | 4/2000 | Payne et al. | |
| 6,064,986 A | 5/2000 | Edelman | |
| 6,275,807 B1 | 8/2001 | Schirripa | |
| 6,611,808 B1 * | 8/2003 | Preti et al. | 705/4 |
| 6,611,815 B1 | 8/2003 | Lewis et al. | |
| 6,636,834 B1 | 10/2003 | Schirripa | |
| 6,950,805 B2 | 9/2005 | Kavanaugh | |
| 6,963,852 B2 | 11/2005 | Koresko | |
| 7,016,871 B1 | 3/2006 | Fisher et al. | |
| 7,080,032 B2 | 7/2006 | Abbs et al. | |

(Continued)

OTHER PUBLICATIONS

Anonymous; Part IV: Insurance: Protecting What You've Got—Chapter 16: Insurance on You: Life, Disability and Health; Personal Finance for Dummies (5th ed.); Hoboken: 2006, 23 pgs.

(Continued)

*Primary Examiner* — Muriel Tinkler
(74) *Attorney, Agent, or Firm* — Howard IP Law Group, PC

(57) ABSTRACT

A computer implemented data processing system and method administers a deferred variable annuity contract during the accumulation phase for a relevant life. The annuity contract has a payment base value, a contract value, and a step-up provision. Administration of the product determines whether a step-up of the payment base value is applicable. If applicable, the product determines a step-up, wherein the step-up is guaranteed at a predetermined percentage. The investments of the deferred variable annuity contract are not limited to a specific asset allocation in order to qualify for the step-up provision.

20 Claims, 11 Drawing Sheets

| Year | Return | Account Value | Step-up Method A | | Step-up Method B | |
|---|---|---|---|---|---|---|
| | | | Step-up % | Pmt Base | Step-up % | Pmt Base |
| | | $ 100,000 | | $ 100,000 | | $ 100,000 |
| 1 | 32% | 132,000 | 10% | 110,000 | 10% | 110,000 |
| 2 | 7% | 141,240 | 7% | 117,700 | 10% | 121,000 |
| 3 | -8% | 129,941 | 0% | 117,700 | 7% | 129,941 |
| 4 | 15% | 149,432 | 6% | 124,527 | 10% | 142,935 |
| 5 | 18% | 176,330 | 10% | 136,979 | 10% | 157,228 |
| 6 | -12% | 155,170 | 0% | 136,979 | 0% | 157,228 |
| 7 | -2% | 152,067 | 0% | 136,979 | 0% | 157,228 |
| 8 | 12% | 170,315 | 0% | 136,979 | 8% | 170,315 |
| 9 | 20% | 204,378 | 10% | 150,677 | 10% | 187,346 |
| 10 | -6% | 192,115 | 0% | 150,677 | 3% | 192,115 |

U.S. PATENT DOCUMENTS

| | | | |
|---|---|---|---|
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,376,608 B1* | 5/2008 | Dellinger et al. | 705/36 R |
| 7,398,241 B2 | 7/2008 | Fay et al. | |
| 7,613,644 B1 | 11/2009 | Abbs et al. | |
| 7,624,058 B1 | 11/2009 | Abbs et al. | |
| 7,711,624 B2 | 5/2010 | Abbott et al. | |
| 2001/0014873 A1 | 8/2001 | Henderson et al. | |
| 2001/0047325 A1 | 11/2001 | Livingston | |
| 2002/0035527 A1 | 3/2002 | Corrin | |
| 2002/0174045 A1 | 11/2002 | Arena et al. | |
| 2002/0188540 A1 | 12/2002 | Fay et al. | |
| 2002/0194098 A1 | 12/2002 | Stiff et al. | |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0163402 A1 | 8/2003 | Kincart | |
| 2003/0171956 A1 | 9/2003 | Cox et al. | |
| 2003/0187764 A1 | 10/2003 | Abbs et al. | |
| 2004/0039601 A1 | 2/2004 | Anderson | |
| 2004/0039608 A1 | 2/2004 | Mazur et al. | |
| 2004/0088236 A1 | 5/2004 | Manning | |
| 2004/0172350 A1 | 9/2004 | Atkinson et al. | |
| 2004/0177022 A1 | 9/2004 | Williams et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0010453 A1 | 1/2005 | Terlizzi et al. | |
| 2005/0060251 A1 | 3/2005 | Schwartz et al. | |
| 2005/0080698 A1 | 4/2005 | Perg et al. | |
| 2005/0144103 A1 | 6/2005 | Perg et al. | |
| 2005/0144124 A1 | 6/2005 | Stiff et al. | |
| 2005/0177473 A1 | 8/2005 | Angle | |
| 2005/0234821 A1* | 10/2005 | Benham et al. | 705/40 |
| 2005/0240521 A1 | 10/2005 | Fuentes-Torres | |
| 2006/0074787 A1 | 4/2006 | Perg et al. | |
| 2006/0080148 A1 | 4/2006 | Koresko | |
| 2006/0085338 A1 | 4/2006 | Stiff et al. | |
| 2006/0089892 A1 | 4/2006 | Sullivan et al. | |
| 2006/0095353 A1 | 5/2006 | Midlam | |
| 2006/0111997 A1* | 5/2006 | Abbott et al. | 705/35 |
| 2006/0111998 A1 | 5/2006 | Fisher et al. | |
| 2006/0143055 A1 | 6/2006 | Loy et al. | |
| 2006/0149651 A1 | 7/2006 | Robinson | |
| 2006/0155622 A1 | 7/2006 | Laux | |
| 2006/0190373 A1 | 8/2006 | Perg et al. | |
| 2006/0195375 A1 | 8/2006 | Bohn | |
| 2006/0206398 A1 | 9/2006 | Coughlin | |
| 2006/0206401 A1 | 9/2006 | Abbs et al. | |
| 2006/0212379 A1 | 9/2006 | Perg et al. | |
| 2006/0212380 A1 | 9/2006 | Williams et al. | |
| 2006/0242052 A1 | 10/2006 | Long et al. | |
| 2007/0011063 A1 | 1/2007 | Shelon et al. | |
| 2007/0011069 A1 | 1/2007 | Bevacqua, Jr. | |
| 2007/0011086 A1 | 1/2007 | Dellinger et al. | |
| 2007/0021986 A1 | 1/2007 | Cheung et al. | |
| 2007/0033124 A1 | 2/2007 | Herr et al. | |
| 2007/0038488 A1 | 2/2007 | Bauer et al. | |
| 2007/0078690 A1 | 4/2007 | Kohl | |
| 2007/0100715 A1 | 5/2007 | O'Donnell et al. | |
| 2007/0100720 A1 | 5/2007 | Bonvouloir | |
| 2007/0100726 A1 | 5/2007 | O'Flinn et al. | |
| 2007/0100727 A1 | 5/2007 | Multer et al. | |
| 2007/0106589 A1 | 5/2007 | Schirripa | |
| 2007/0130035 A1 | 6/2007 | Carden | |
| 2007/0162380 A1 | 7/2007 | Conroy | |
| 2007/0198352 A1 | 8/2007 | Kannegiesser | |
| 2007/0198377 A1 | 8/2007 | Livingston et al. | |
| 2007/0239572 A1 | 10/2007 | Harris et al. | |
| 2007/0244777 A1 | 10/2007 | Torre et al. | |
| 2007/0271201 A1 | 11/2007 | Armand et al. | |
| 2007/0278288 A1 | 12/2007 | Simmons | |
| 2008/0010095 A1 | 1/2008 | Joyce | |
| 2008/0071661 A1 | 3/2008 | Jeudy et al. | |
| 2008/0189223 A1 | 8/2008 | Baiye | |
| 2008/0270194 A1 | 10/2008 | West et al. | |

OTHER PUBLICATIONS

Pizzani, Lori; Annuity Helps with Long-Term Care, Annuity Market News, Sep. 1, 1999, 2 pgs.

Granza, Lee et al.; Financing long-term care: Employee needs and attitudes, and the employer's role; Benefits Quarterly, Brookfield: 4th qtr 1988. vol. 14, Iss. 4, 13 pgs.

Prospectus, Penn Mutual Variable Annuity Account III, Enhanced Credit Variable Annuity; May 1, 2007.

"Glossary of Insurance Terms", Insurance Information Institute, http:www.iii.org/media/glossary (Jan. 1, 2008).

Penn Mutual Variable Annuity Account III, SEC Form 497, Filed Oct. 2, 2006.

New York Life Longevity Benefit Variable Annuity Brochure, New York Life Insurance Company, May 2007.

New York Life Longevity Benefit Variable Annuity FactSheet, New York Life Insurance Company, May 2007.

Paradis, T., More Funds Adopt Performance-Based Fees, Washingtonpost.com (Associated Press), Apr. 8, 2007.

"Facts about the New York Life Longevity Benefit Variable Annuity Product", New York Life Insurance Company, May 2007.

New York Life Longevity Benefit Variable Annuity Prospectus Amendment dated Aug. 15, 2007, New York Life Insurance Company, Aug. 2007.

S&P U.S. Indices Index Methodology, Standard & Poor's, Sep. 2007.

Blodget, H., Money for Nothing: The Real Trouble with Mutual Funds, Slate.com, Dec. 1, 2004.

"Income Select for Life"; https://www.tran.samericaadvisor.cony/contentServer/MediaServer? uri=/site/tciidex/media/PDF/Annuities_TCI/Client_Approved_Material/Tips_and_Techniques/. BRIS.pdf; May 2007.

"Jackson Enhances Living Benefit Options within its Perspective Family of Variable Annuities"; Business Wire; Apr. 30, 2007.

"Lifetime Legacy" http://www.americo.com/lifetirne/lifetimelegacy.html, no later than Jul. 23, 2007.

"Accelerated Death Benefits"; http://www.medicare.gov/; Accessed Jan. 4, 2008.

"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.

"Just the Facts: The Best of America All American Gold Annuity Key Facts"; Nationwide Financial Services, Inc.; https://ssc.nwseivicecenter.com/media/pdf/product/VAM-0504AO-FLpdf, Sep. 2007.

Form N-4, Transamerica Life Insurance Company; Flexible Premium Variable Annuity-J; Separate Account VA Y; filed Feb. 22, 2006.

"Fidelity.com Glossary"; https://scs.fidelity.com/webxpress/help/topics/help_definition_p.shtml, no later than Jul. 23, 2007.

Stout, R.G. et al.; "Dynamic Retirement Withdrawal Planning"; Financial Services Review 15 (2006) 117-131.

"Prudential Investments Introduces Strategic Partners Annuity One; New Variable Annuity Offers Investors World-Class Money Managers and Flexible Product Features"; Business Wire, Oct. 9, 2000.

"Retireonyourterms"; http://www.retireonyourterms.com/ glossary/GlossaryText.htm, Jul. 23, 2007.

Buckingham, B.; "Making IRAs Last a Lifetime with Annuities"; Life & Health Advisor; Mar. 2006.

"RiverSource Innovations Select Variable Annuity"; http://www.riversource.com/rvsc/global/docs/INNOV-SELECT-NY-AAG.pdf, Aug. 2007.

"Pacific Life Individual (k) Program"; https://annuities.myaccount.pacificlife.com/public/corporate/product_info/pos/guide pos_1911-07b.pdf, Nov. 2007.

Key to Making Retirement Savings last: The Withdrawal Rate, New York Life, www.newyorklife.com/cda/0,3254,14198,00.html. (accessed May 22, 2008).

Anonymous "Q2 2005 American Eqty Invt Life Hld Co Earnings Conference Call-Final" Aug. 4, 2005, Fair Disclosure Wire.

Shapiro et al. "Separating Annuity Buyers by Fixed Vs. Variable" Apr. 5, 1993, National Underwriter Life. Health.Financial Serviecs), V97N14 pp. 20-21.

"The Power and Protection of Income Annuities", (Empire Fidelity Investments Life Insurance Company), http //personal.fidelity.com/products/annuities/pdf/IncomeAnnuitySpecialReport.pdf, Mar. 2006.
Form 485BPOS (Apr. 26,2006), Transamerica-NewLTC-LifetimeGMWB_May2006SECFiling.pdf.
Anonymous, "Full disclosure variable life report. (Policy Analysis)" Nov. 13, 2006, National Underwriter Life & Health, v110, n43, p. 30.
Anonymous, "Risk Management: You've Come a Long Way, Baby", Aug. 1, 2005, Annuity Market News.
The Right Rider: Boomers want guaranteed lifetime income, but don't want to buy an immediate annuity. Variable annuity issuers think they have a solution. Donald Jay Korn. Financial Planning. New York: Feb. 1, 2006. p. 104-106.

Panko, Ron. New Products. Best's Review, 108(3), 24. (Jul. 2007).
Antolin, Pablo. Longevity Risk and Private Pensions. Financial Market Trends,(92), 107,109-128. (Jun. 2007).
Yates, Karen E & Liss, Stephen. Charitable Lead Annuity Trusts—A Primer. Taxation of Exempts, 19(1), 23. (Jul. 2007).
Harshman, Scott & Schaller, Gordon. Private Annuities: An Income Tax Deferral Technique. Orange County Business Journal, 29(39), A56-A57. (Sep. 2006).
Scudder Investments Introduces Two New Variable Annuity Products with Travelers Life & Annuity, Jun. 9, 2003, PR newswire, pp. 1-4.
"American Skandia Life Assurance Corpt/CT", publisher: Edgar Online, dated Dec. 31, 2007.

* cited by examiner

Fig. 10

| Year | Original Payment Base | Step-up Method A | Step-up Method B |
|---|---|---|---|
| 0 | 5,000 | 5,000 | 5,000 |
| 1 | 5,000 | 5,500 | 5,500 |
| 2 | 5,000 | 5,885 | 6,050 |
| 3 | 5,000 | 5,885 | 6,497 |
| 4 | 5,000 | 6,226 | 7,147 |
| 5 | 5,000 | 6,849 | 7,861 |
| 6 | 5,000 | 6,849 | 7,861 |
| 7 | 5,000 | 6,849 | 7,861 |
| 8 | 5,000 | 6,849 | 8,516 |
| 9 | 5,000 | 7,534 | 9,367 |
| 10 | 5,000 | 7,534 | 9,606 |

METHOD AND SYSTEM FOR AN ENHANCED STEP-UP PROVISION IN A DEFERRED VARIABLE ANNUITY WITH A RISING GUARANTEED STEP-UP

CROSS-REFERENCE TO RELATED APPLICATIONS

This application is a continuation application of U.S. patent application Ser. No. 11/983,512 entitled Method And System For An Enhanced Step-Up Provision In A Deferred Variable Annuity With A Rising Guaranteed Step-Up, filed Nov. 9, 2007 now U.S. Pat. No. 7,848,989, which application claims priority to application Ser. No. 60/961,797, filed Jul. 24, 2007, the entire contents of all of which are herein incorporated by reference for all purposes.

BACKGROUND OF THE INVENTION

1. Field of the Invention

The present invention relates to a method and system for administering a variable annuity; and more particularly, to a data processing method for administering a deferred variable annuity contract during the accumulation phase, the annuity contract having a payment base value, a contract value, and a step-up provision with a guaranteed step-up.

2. Description of the Prior Art

An immediate annuity is typically used to provide an income stream within a predetermined length of time from the date the premium is received. The amount of income can be either fixed or variable in nature and typically these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life which transfers some portion or all of the risk of outliving one's accumulated assets to the insurer. One basis for distinguishing commonly available deferred annuities is whether the annuity is classified as a "fixed annuity" or a "variable annuity".

In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee". The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds or sub-accounts may include stocks, bonds, money market instruments, mutual funds, and the like.

Variable annuity contracts typically provide a death benefit. Oftentimes during the accumulation period this death benefit is related to the contract value. That is, if the sub-accounts backing the contract value have performed poorly, then the death benefit may be reduced to an insignificant amount.

After annuitization, the death benefit can be a function of the remaining payments of the annuity at the time of the relevant life's death. Further, if the annuity contract does not provide a guarantee (discussed below), the contract will terminate when the contract value goes to zero or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider.

Most deferred variable annuity products have a payment base and a contract value. The payment base is typically a function of the previous premium payments and withdrawals by the relevant life, and the value of the payment base does not vary with the underlying investments. Unlike the payment base, the contract value of a deferred variable annuity product varies with the performance of the underlying investments. Several prior art variable annuity products provide for an increase (also known as a "step-up") in the value of the payment base if the contract value increases because of favorable performance of the underlying investments. However, most of these prior art step-up plans require that assets be reallocated according to the step-up. Therefore, the providers of many prior art variable annuity products manage the risk associated with the step-up provisions by controlling the asset allocation of the core investments of the annuity. The relevant life is limited to a specific asset allocation in order to qualify for the step-up provisions. Furthermore, these prior art step-up plans do not allow for the possibility of a step-up in flat or down markets.

Many financial products have been disclosed. These include: a financial instrument providing a guaranteed growth rate and a guarantee of lifetime payments, providing flexible income, liquidity options and permanent legacy benefits for annuities, and mortality and expense risk charges with premium-based breakpoints in annuity products. These all contain at least one of the following disadvantages: the plans do not relate to stepping-up the payment base of an annuity contract in response to growth of the contract value; the step-up plan requires a specific asset allocation in order to qualify; the step-up plan does not allow for a step-up to the payment base in flat or down markets; and the step-up of the step-up plan is not guaranteed at a predetermined percentage.

Accordingly, there remains a need in the art for a data processing method for administering a variable annuity contract wherein the annuity contract has a payment base step-up provision and wherein the only restriction on the step-up provision is that the step-up is guaranteed at a predetermined percentage.

SUMMARY OF THE INVENTION

The present invention provides a data processing method for administering a deferred annuity contract during the accumulation phase wherein the annuity contract has a step-up provision. Administration is such that the annuity contract determines whether a step-up of the payment base value is applicable. In one embodiment, the annuity contract determines whether a step-up of the payment base value is applicable at each year's contract anniversary date. By allowing for a step-up provision, the annuity contract provides a benefit to the relevant life should the contract value increase because of appreciation of the underlying investments. In prior art annuity products having step-up provisions, the asset allocation is carefully controlled by the company issuing the annuity contract. On the other hand, the present data processing method for administering a deferred annuity contract having a step-up provision does not limit the asset allocation of the underlying investments. The relevant life has the freedom to invest according to his selections and at the same time enjoys a step-up in the payment base value if the underlying investments perform well. The company issuing the annuity is able to manage the risk by controlling the volatility of the growth of the guarantee associated with the step-up provision by guaranteeing the step-up to a predetermined percentage.

Generally stated, the method of the invention comprises a data processing method for administering a deferred variable contract product during the accumulation phase, the annuity contract having a payment base value, a contract value, and a step-up provision. The present method determines a present payment base value for the annuity contract. In one embodiment the payment base value is a function of the premium payments and withdrawals by the relevant life. If requested by the relevant life, the present method accepts premium payments from the relevant life which increase the payment base value and the contract value. If requested by the relevant life, the present method determines a lifetime benefit payment for the relevant life which decreases the contract value. If requested by the relevant life, the present method determines a withdrawal payment—that is in excess of the lifetime benefit payment—for the relevant life which decreases both the contract value and the payment base value. The present method determines if a "step-up" in the present payment base value is applicable. If the "step-up" is applicable, the present method determines a step-up, wherein the step-up is guaranteed at a predetermined percentage. If the step-up is greater than zero, the present method increases the present payment base value according to the following formula:

New payment base value=present payment base value×(1+step-up).

In one embodiment, the present method repeats the above method steps at each subsequent anniversary date or other time interval. The present invention solves several of the problems associated with conventional administration of annuity contracts having a step-up provision. The present invention provides the relevant life with added benefits of providing continued flexibility of investments and maintaining control of assets instead of being limited to a specific asset allocation in order to qualify for the step-up provisions. Further, the provider of the annuity contract having the step-up provision benefits because it is able to manage the risk by controlling the volatility of the growth of the guarantee associated with the step-up provision because of the rising guarantee on the step-up.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 10 depicts a table illustrating payment base values as a function of time for annuities associated with various step-up determining methods of the preferred embodiment.

DESCRIPTION OF THE PREFERRED EMBODIMENTS

Figure 1:
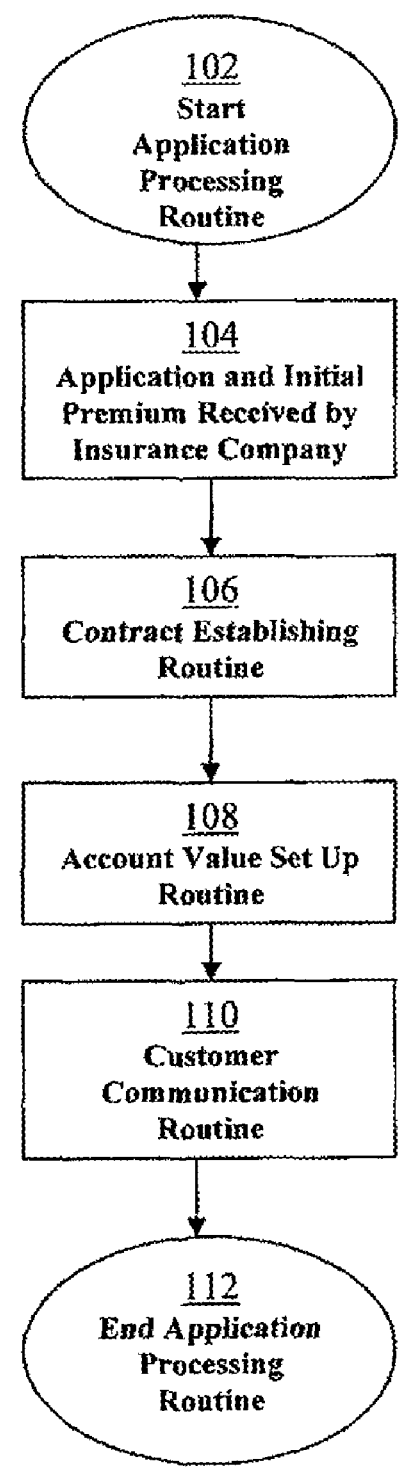
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The following definitions are given hereunder for terms used in the specification:

"Relevant Life" or "Covered Life": The covered life or relevant life is the governing life for determination of the living benefits provided under the annuity contract. The covered life may refer to any one or more of the following: an owner, joint owner, annuitant, joint annuitant, co-owner, co-annuitant or beneficiary.

"Withdrawal Base": The withdrawal base is the amount used in one embodiment of the present invention to determine the lifetime benefit payment. Preferably, the withdrawal base may be equal to the amount of the original premium, the payment base value, the contract value, or the greater of the payment base value and the contract value.

"Payment Base": The Payment Base (PB) (or more accurately the Payment Base Value) is the amount used in one embodiment of the present invention to determine the lifetime benefit payment and the rider charge. In one embodiment of the present invention, the initial payment base value equals the initial premium.

"Premium": 100% of the dollar amount of the initial or subsequent premium payments deposited into the contract before application of any sales charges or payment enhancements.

"Withdrawal Request": A request made by the relevant life to withdraw funds during the "accumulation phase" of the contract. One type of withdrawal is a lifetime benefit payment. Any withdrawal that is in excess of the lifetime benefit payment may: (i) decrease the contract value below the minimum contract value; (ii) decrease the payment base value; and (iii) decrease the guaranteed death benefit.

"Lifetime Benefit Payment": A benefit payment that is available until the death of the relevant life. The lifetime benefit payment may be paid yearly in one embodiment. The total lifetime benefit payment for the year may also be distributed monthly, quarterly or any other defined period. Preferably, if the covered life age is 60 (or other predetermined age) or older, then LBP=payment base value×the WP (withdrawal percent) for the relevant life's attained age. Preferably, if the relevant life is age 59 (or other predetermined age) or younger, the LBP is equal to zero. Other age restrictions can also be utilized for the lifetime benefit payment. A lifetime benefit payment withdrawal will not decrease the contract value below the minimum contract value. The lifetime benefit payment may also be determined by the following formula:

LBP=the greater of:

"the guaranteed lifetime benefit payment"

(the payment base value)×(the withdrawal percent); and

"the maximum lifetime benefit payment"

(the present contract value)×(the withdrawal percent).

It should be understood that in other embodiments of the present invention, other formulas may be utilized for determining the lifetime benefit payment.

"Contract Value (CV)": A numerical measure of the relative worth of a variable annuity product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

"Sub-account": Variable account investments within the variable annuity contract, such as mutual funds, stocks and bonds.

"Withdrawal": Also known as a "surrender", a relevant life may withdraw up to the contract value at any time.

"Death Benefit": The death benefit provision guarantees that upon death of the relevant life a death benefit (DB) is paid to a beneficiary named in the contract that is equal to the greater of the guaranteed death benefit or the contract value as of the date that proof of death is received. It should be understood that in other embodiments of the present invention, other formulas may be utilized for determining the guaranteed death benefit.

"AMF": Annual Maintenance Fee.

"Annuity Commencement Date": The annuity commencement date (ACD) is the date upon which the contract enters the "annuitization phase".

"Withdrawal Percent": In one embodiment of the present invention, the withdrawal percent (WP) is used to determine the amount of the lifetime benefit payment. It should be understood that in other embodiments of the present invention, other formulas may be utilized for determining the lifetime benefit payment.

"PB increase": Payment Base increase.

"Step-Up": An increase to the payment base value that is available if the contract value increases because of favorable performance of the underlying investments. Preferably, the step-up is guaranteed at a predetermined percentage.

"High Water Mark": A predetermined threshold. In one embodiment, the high water mark is equal to the previously highest contract value (minus the rider fee) as determined at periodic time intervals.

"Partial Surrender": Partial surrender means the gross amount of the partial surrender and will include any applicable contingent deferred sales charges.

"Covered Life Change": Any contractual change before ACD which causes a change in the covered life will result in a reset in the benefits provided under the rider and allows the issuing company to impose the fund allocation restrictions.

"Annuity Contract": The term annuity contract means a set of rules and other data that are reflected in a computer processing system for operations of the annuity product.

"Issue Rules": A contract may be subject to certain established rules in order for it to issue. For example, an issue rule may exist that establishes a maximum age whereby it will not issue if the covered life or annuitant is over the maximum age.

The data processing method of the present invention requires further explanation of these terms to better understand the novelty of the invention and how the relevant processing occurs. The following description of these terms is intended for exemplary purposes to better understand the scope of the invention and is not intended to be limiting.

The covered life, or relevant life, which is the governing life for determining the living benefits provided, may have a single life election or joint/spousal continuation election as described more fully herein.

Single Life Election:

If a natural owner, the covered life is the owner and the joint owner (if any) on the contract or rider effective date. If a non-natural owner—the covered life is the annuitant on the contract or rider effective date. All age-contingent benefit provisions are based on the attained age of the oldest covered life.

Joint/Spousal Continuation Election:

If a natural owner—the covered life is both the spouses (as defined by Federal Law). All age-contingent benefit provisions are based on the attained age of the youngest covered life.

Issue rules are set forth to provide a more complete understanding of one embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules that govern the issuance of the annuity contract may include a maximum issue age. Benefit option 1 is an optional feature of the present invention and does not apply to the preferred embodiments because it does not include a step-up provision. In benefit option 1, the riders are not available if any covered life or annuitant is age 81 (or other predetermined age) or greater on the rider effective date. For benefit option 2, these riders are not available if any covered life or annuitant is age 76 (or other predetermined age) or greater on the rider effective date. The rider may be elected on contract issue or post-issue.

Single Life Election: No additional requirements

Joint/Spousal Continuation Election: (this May Also Include Co-Annuitants)

One of the following must apply:
- If a natural owner purchases joint/spousal election, and adds a spousal joint owner, then the owner can name anyone else as the designated beneficiary because by contract disposition, the joint owner will receive the death benefit.
- If a natural owner purchases joint/spousal election, and does not add a joint owner, then the owner must name their spouse as the designated beneficiary.
- If a non-natural owner purchases joint/spousal election, then the annuitant's spouse must be the designated beneficiary. A joint owner who is not the owner's spouse is not allowed.

Calculation of the Withdrawal Percent (WP)

The Withdrawal Percent (WP) is used to determine the amount of the lifetime benefit payment. The WP is determined at the later of: the attained age of the covered life on the most recent contract anniversary prior to the first withdrawal, or the contract anniversary immediately following the covered life's $60^{th}$ birthday (or other predetermined age). Below is a brief summary of the WP for single life election and joint/spousal continuation election.

Single Life Election: (Note: the following percentages and ages, if ages are in fact used, can vary)
- 5.0% for attained ages 60 to 64;
- 5.5% for attained ages 65 to 69;
- 6.0% for attained ages 70 to 74;
- 6.5% for attained ages 75 to 79;
- 7.0% for attained ages 80 and above.

Joint/Spousal Continuation Election:
- 4.5% for attained ages 60 to 64;
- 5.0% for attained ages 65 to 69;
- 5.5% for attained ages 70 to 74;
- 6.0% for attained ages 75 to 79;
- 6.5% for attained ages 80 and above.

Calculation of the Payment Base (PB)

The Payment Base (PB) (or more accurately payment base value) is the amount used to determine the lifetime benefit payment (LBP) and the rider charge. A total partial surrender amount in a contract year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents.

The maximum PB is $5,000,000. If the rider is effective on the contract issue date, then the PB equals the X % of the initial premium. If the rider is effective after the contract issue date, then the PB equals 100% of the dollar amount of the contract value on the rider effective date, less any payment enhancements received in the last 12 months. When subsequent premium payments are received, the PB will be increased by 100% of the dollar amount of the subsequent premium payment.

Whenever a partial surrender is made prior to the contract anniversary immediately following the covered life's $60^{th}$ birthday (or other predetermined age), the payment base is reduced for an adjustment defined below. The threshold is 5% single/4.5% joint/spousal multiplied by the greater of the payment base or contract value at the beginning of the contract year plus subsequent premiums prior to a partial surrender. For cumulative partial surrenders during each contract year that are equal to or less than the threshold, the adjustment is equal to the dollar amount of the partial surrender. For any partial surrender that first causes cumulative partial surrenders during the contract year to exceed the threshold, the adjustment is the dollar amount of the partial surrender that does not exceed the threshold. For the portion of the withdrawal that exceeds the threshold, the adjustment is a factor. The factor is as follows:

$$1-(A/(B-C)) \text{ where}$$

A=partial surrenders during the contract year in excess of the threshold;
B=contract value immediately prior to the partial surrender; and
C=the threshold, less any prior partial surrenders during the contract year. If C results in a negative number, C becomes zero.

For partial surrenders during each contract year, where the sum of prior partial surrenders are in excess of the threshold, the adjustment is a factor. The factor is applied to the payment base immediately before the surrender. The factor is as follows:

$$1-(A/B) \text{ where}$$

A=the amount of the partial surrender; and
B=contract value immediately prior to the partial surrender.

Whenever a partial surrender is made on or after the contract anniversary immediately following the covered life's $60^{th}$ birthday (or other predetermined age), the PB will be equal to the amount determined as follows:
- If the total partial surrenders since the most recent contract anniversary are equal to or less than the current lifetime benefit payment (LBP), the PB is not reduced by the amount of the partial surrender.
- If the total partial surrenders since most recent contract anniversary are more than the current LBP, but all partial surrenders were paid under the Automatic Income Required Minimum Distribution (AI RMD), the PB is not reduced by the amount of partial surrender.

For any partial surrender that first causes cumulative partial surrenders during the contract year to exceed the current LBP, and the RMD exception above does not apply, the adjustment is a factor. The factor is as follows:

$$1-(A/(B-C)) \text{ where}$$

A=partial surrenders during the contract year in excess of the LBP;

B=contract value immediately prior to the partial surrender; and

C=the LBP, less any prior partial surrenders during the contract year. If C results in a negative number, C becomes zero.

For additional partial surrender(s) in a contract year, where the sum of all prior partial surrenders exceed the current LBP, the PB will be reduced by applying a factor. The factor is as follows:

1−(A/B) where

A=the amount of the partial surrender; and

B=contract value immediately prior to the partial surrender.

Benefit Increase Provision(s) May Apply

Benefit Option 1

The withdrawal percent will be set at the attained age of the first withdrawal and will not increase thereafter.

Benefit Option 2

The benefit increase is facilitated through an increase (step-up) in the payment base. On every contract anniversary up to and including the contract anniversary immediately following the covered life's $80^{th}$ birthday (or other predetermined age), whether an increase (step-up) in the PB is applicable will be automatically determined. If an increase is applicable, the PB will be automatically increased by the factor below, subject to a minimum of 0% and a maximum of 10% (note: the percentage could change or it could be a full step up (no limit)):

(Contract value prior to rider charge taken on current anniversary/Maximum contract value)−1 where maximum contract value equals the greater of (A) or (B) below:
(A) the contract value on the rider effective date, plus premiums received after the rider effective date
(B) the contract value on each subsequent contract anniversary, excluding the current contract anniversary plus premiums received after the contract anniversary date. (Similar to MAV except that there is no adjustment for withdrawals.) The WP is locked in on the date of the first withdrawal.

Benefit Option 3

The benefit increase is facilitated through an increase (step-up) in the payment base. On every contract anniversary up to and including the contract anniversary immediately following the covered life's $80^{th}$ birthday (or other predetermined age), whether an increase (step-up) in the PB is applicable will be automatically determined. The step-up is applicable only if the present contract value is greater than the previous year's payment base. If an increase is applicable, the PB will be automatically increased by the factor below, subject to a minimum of 0% and a maximum of 10% (note: the percentage could change or it could be a full step up (no limit)):

(Contract value prior to rider charge taken on current anniversary/Previous year's payment base)−1.

Calculation of the Lifetime Benefit Payment

The Lifetime Benefit Payment (LBP) is available until the death of any covered life or until the withdrawal benefit is revoked.

A total partial surrender amount in a contract year that exceeds the LBP by not more than $0.12 (the "tolerance amount") will be deemed not more than the LBP. This provision recognizes that owners may take the LBP in installments over the year, and the amount of installment may round the proportional distribution amount to the higher cent. Therefore, owners intending to stay within the LBP may exceed it by only a few cents. On the rider effective date:

If the covered life is age 60 (or other predetermined age) or older on the rider effective date, the LBP is equal to the payment base multiplied by the WP for the covered life's attained age.

If the covered life is age 59 (or other predetermined age) or younger on the rider effective date, the LBP is equal to zero.

On any contract anniversary immediately following the covered life's $60^{th}$ birthday (or other predetermined age), the LBP is equal to the WP multiplied by the greater of payment base or the contract value on the anniversary for both the age-based and the market-based riders, single and spousal. The LBP can fluctuate year to year due to market performance, but will never be lower than the WP multiplied by the PB as long as the covered life has reached the age of 60 (or other predetermined age). Also, if the account value on the anniversary exceeds the PB, the LBP may decrease in future years but will never be less than the PB multiplied by the WP.

When a subsequent premium payment is made after the contract anniversary immediately following the covered life's $60^{th}$ Birthday (or other predetermined age), the LBP is equal to the greater of: (i) the WP, on the most recent contract anniversary, multiplied by the greater of the PB or contract value immediately after the subsequent premium is received, or (ii) the prior LBP.

Whenever a partial surrender is made on or after the contract anniversary immediately following the covered life's $60^{th}$ Birthday (or other predetermined age), if the PB is zero due to withdrawals, the LBP is equal to zero. During the deferral stage, subsequent premiums may be made to re-establish the PB and the LBP. The LBP will be equal to the amount determined in either one as follows:

If the total partial surrenders since the most recent contract anniversary are equal to or less than the current lifetime benefit payment (LBP), the LBP is equal to the LBP immediately prior to the partial surrender.

If the total partial surrenders since the most recent contract anniversary are more than the current LBP, but all partial surrenders were paid under the Automatic Income Required Minimum Distribution (AI RMD), the provisions of above will apply.

If the total partial surrenders since the most recent contract anniversary are more than the current LBP and the AI RMD exception above does not apply, the LBP is reset to the WP on the most recent contract anniversary multiplied by the greater of the PB or contract value immediately after the partial surrender.

The contract owner may request an amount less than, equal to, or greater than the lifetime benefit payment. Total partial surrenders taken during a contract year on or after the contract anniversary immediately following the covered life's $60^{th}$ birthday (or other predetermined age) which exceed the LBP may reduce future LBP values and may reduce the PB. If the total amount requested by the contract owner during a contract year is less than the lifetime benefit payment, the excess cannot be carried over to increase future years' lifetime benefit payments.

Contingent Deferred Sales Charge (CDSC)—Free Up to the Amount of the LBP

If the LBP exceeds the actual withdrawal amount (AWA) on the most recent contract anniversary, any contingent deferred sales charge (CDSC) will be waived up to the LBP amount.

Death Benefit Before Annuity Commencement Date

For both single and joint/spousal election, a death benefit may be available on the death of any owner or annuitant. For joint/spousal election only, no death benefit will be available when a covered life is the beneficiary, and the beneficiary dies. The death benefit provision guarantees that upon death a death benefit (DB) equal to the greater of the death benefit or the contract value as of the date proof of death is received will be paid. The rider charge is not assessed on death. When proof of death is processed, the contract will go into suspense mode. No charges will apply during that period. The amount available to be paid as a death benefit under the terms of the rider is a return of premium adjusted for subsequent premium payments and partial surrenders. If the rider is effective on the contract issue date, then the DB equals the initial premium. If the rider is effective after the contract issue date, then the DB equals 100% of the dollar amount of the contract value on the rider effective date, less any bonus payments paid into the contract by the company in the last 12 months. When a subsequent premium payment is received, the DB will be increased by 100% of the dollar amount of the subsequent premium payment.

If the withdrawal feature is revoked, all future withdrawals from the death benefit will be fully proportional as of the date it is revoked.

Whenever a partial surrender is made prior to the contract anniversary immediately following the covered life's $60^{th}$ birthday (or other predetermined age), the death benefit is reduced for an adjustment defined below. For the threshold definition, refer to discussion above under "Calculation of the Payment Base" on page 16. For cumulative partial surrenders during each contract year that are equal to or less than the threshold, the adjustment is the dollar amount of the partial surrender. For any partial surrender that first causes cumulative partial surrenders during the contract year to exceed the threshold, the adjustment is the dollar amount of the partial surrender that does not exceed the threshold and the adjustment for the remaining portion of the partial surrender is a factor. The factor is applied to the portion of the death benefit that exceeds the threshold. The factor is as follows:

$1-(A/(B-C))$ where

A=partial surrenders during the contract year in excess of the threshold;
B=contract value immediately prior to the partial surrender; and
C=the threshold less any prior partial surrenders during the contract year. If C results in a negative number, C becomes zero.

For partial surrenders during each contract year, where the sum of the prior partial surrenders in the year are in excess of the threshold, the adjustment is a factor. The factor is applied to the adjusted death benefit immediately before the surrender. The factor is as follows:

$1-(A/B)$ where

A=the amount of the partial surrender; and
B=contract value immediately prior to the partial surrender.

Whenever a partial surrender is made on or after the contract anniversary immediately following the covered life's $60^{th}$ birthday (or other predetermined age), the DB will be equal to the amount determined as follows:

If the total partial surrenders since the most recent contract anniversary are equal to or less than the current lifetime benefit payment (LBP), the DB becomes the DB immediately prior to the partial surrender, less the amount of partial surrender, less the amount of partial surrender paid out of the general account of the company.

If the total partial surrenders since the most recent contract anniversary are more than the current LBP, but all partial surrenders were paid under the Automatic Income RMD (AI RMD), the DB becomes the DB immediately prior to the partial surrender, less the amount of partial surrender, less the amount of partial surrender paid out of the general account of the company.

If the total partial surrenders since the most recent contract anniversary exceed the total current LBP and the AI RMD exception in does not apply, the adjustment is the dollar amount of the partial surrender that does not exceed the LBP, and the adjustment for the remaining portion of the partial surrender is a factor. The factor is applied to the portion of the death benefit that exceeds the LBP. The factor is as follows:

$1-(A/(B-C))$ where

A=partial surrenders during the contract year in excess of the LBP;
B=contract value immediately prior to the partial surrender; and
C=LBP less any prior partial surrenders during the contract year. If C results in a negative number, C=zero.

For partial surrenders during each contract year, where the sum of the prior partial surrenders in the year are in excess of the current LBP, the adjustment is a factor. The factor for adjustments for partial surrenders for the death benefit is applied to the adjusted death benefit immediately before the surrender. The factor is as follows:

$1-(A/B)$ where

A=the amount of the partial surrender; and
B=contract value immediately prior to the partial surrender.

Contract Value (CV) Reduces Below Minimum Contract Value (MCV) Rules

The minimum contract value (MCV) rules are an optional feature of the present invention and do not apply to the preferred embodiments. If the MCV rules are selected to be applied, then the following rules are used. The MCV is defined as 20% or some other predetermined percentage of the relevant life's payment base on the date of a withdrawal request. Lifetime benefit payments (LBP) cannot reduce the contract value (CV) below this minimum threshold. Only sub-account performance and withdrawals in excess of the LBP can decrease the CV below the MCV.

If total partial surrenders since the most recent contract anniversary are less than or equal to the difference between the CV and the MCV, the CV will be reduced by the total partial surrender. If the CV at the time of a partial surrender is less than or equal to the MCV, the CV will not be decreased for the partial surrender. The requested partial surrender will be paid out of the general account assets of the company.

If the CV immediately before the partial surrender is greater than the MCV, but would drop below the MCV after the partial surrender, the CV will be liquidated to pay the LBP only to the extent it would equal the MCV. The remaining portion of the LBP that is not funded by the CV will be paid out of the general account assets of the company.

Covered Life Change(s)

A covered life change is any contractual change before the ACD which causes a change (defined infra) in the covered life that will result in a reset in the benefits provided under the rider and allows the imposition of the fund allocation restrictions. Covered life changes in the first 6 months of the contract issue date (or other time period) will not cause a change in the DB or PB. However, the WP and LBP may change based on the attained age of the covered life after the covered life change.

If the covered life is changed and a withdrawal has been taken, both within the first 6 months from contract issue date (or other time period), then the LBP and WP will be calculated at the time of the covered life change and will be based on the new covered life's attained age on the rider effective date. If the covered life is changed and a withdrawal has not been taken, both within the first 6 months from contract issue date (or other time period), then the LBP and WP will be calculated upon the first withdrawal as follows:

> If the first withdrawal is after the first 6 months and before the first contract anniversary (or other time period), then the LBP and WP will be based on the new covered life's attained age on the rider effective date.
>
> If the first withdrawal occurs after the first contract anniversary, then the LBP and WP will be calculated based on the new covered life's attained age on the most recently attained contract anniversary.
>
> If the oldest covered life after the change is greater than the age limitation of the rider at the time of the change, then the rider will terminate and the death benefit will be equal to contract value.

Single Life Election:

Covered life changes after the first 6 months of contract issue date will cause a reset in the benefits listed below.

If the oldest covered life after the change is equal to or less than age limitation of the rider at the time of the change, then either below will automatically apply.

> If the rider is not currently available for sale, the withdrawal feature of the rider will be revoked.
>> The existing rider will continue with respect to the death benefit only.
>> The death benefit will be recalculated to the lesser of contract value or the DB on the effective date of the covered life change.
>> The rider charge is assessed on the revocation date, and then will no longer be assessed.
>
> If the rider is currently available for sale, the existing rider will continue with respect to all benefits, at the current rider charge.
>> The PB will be reset to the minimum of the contract value or the PB on the date of the change.
>> The DB will be reset to the minimum of the contract value or the DB on the date of the change.
>> The WP and LBP will be recalculated on the date of the change and will be based on:
>>> If withdrawals are taken prior to the first contract anniversary, the new covered life's attained age on the rider effective date will be used.
>>> If withdrawals are taken after the first contract anniversary, the new covered life's attained age on the contract anniversary prior to the first withdrawal will be used.
>> The maximum contract value will be recalculated to equal the contact value on the date of the covered life change.

If the oldest covered life after the change is greater than the age limitation of the rider at the time of the change, then the rider will terminate, and the death benefit will be equal to contract value. If the rider is no longer available for sale and the issue age of the rider has been changed (to be determined on a non-discriminatory basis), and a covered life change occurs, and they exceed that newly determined age limitation, then rider will terminate, and the death benefit will be equal to contract value.

Joint/Spousal Continuation Election:

After the first 6 months of contract issue date, if the owner and owner's spouse are no longer married for reasons other than death, then covered life changes may occur as follows:

> If surrenders have not been taken from the contract, then the PB, the DB and the MCV remain the same; the covered life will be reset and the WP scale will be based on the youngest covered life as of the date of the change. Owner may remove owner's spouse as a covered life and replace owner's original spouse with owner's new spouse (these changes do not have to happen on the same day).
>
> If surrenders have been taken from the contract, then owner may remove owner's spouse. The PB, the DB and the maximum contract value remain the same; the WP scale will be based on the attained age of the remaining covered life as of the date of the change. Any changes other than removing the spouse will follow the rules of below.
>
> If the oldest covered life after the change is greater (older) than the age limitation of the rider at the time of the change, then the rider will terminate. The death benefit will be equal to contract value.
>
> If any other contractual change causes a change in the covered life, then either will automatically apply:
>> If the oldest covered life after the change is equal to or less (younger) than the age limitation of the rider at the time of the change, then the withdrawal feature of this rider will be revoked. The existing rider will continue with respect to the death benefit only. The rider charge is assessed on the revocation date, and then will no longer be assessed.
>> If the oldest covered life after the change is greater (older) than the age limitation of the rider at the time of the change, then the rider will terminate. The death benefit will be equal to the contract value.
>
> If the rider is no longer available for sale and the issue age of the rider is changed (to be determined on a non-discriminatory basis), and a covered life change occurs, and they exceed that newly determined age limitation, then the rider will terminate, and the death benefit will be equal to the contract value.
>
> If the spouse dies and is the primary beneficiary and the covered life, then the owner may remove the spouse from the contract. The PB, DB and the maximum contract value will remain the same. The WP will be recalculated as follows:
>> If there has been a partial surrender since the rider effective date, then WP will remain at the current percentage.
>> If there has not been a partial surrender since the rider effective date, then WP is based on the attained age of the remaining covered life on the contract anniversary prior to the first surrender.

Spousal Continuation

Single Life Election:

In the event the contract owner dies and spousal continuation is elected, the contract value will increase to the DB value (the greater of the contract value and the DB). The covered life will be re-determined on the date of the continuation. If the covered life is less than age 81 (or other predetermined age) at the time of the continuation, then either of the below will automatically apply:

> If the rider is not currently available for sale, the withdrawal feature of the rider will be revoked. The existing rider will continue with respect to the death benefit only. The rider charge is not assessed on the revocation date, and then is no longer assessed.

If the Rider is currently available for sale, the existing Rider will continue with respect to all benefits at the current Rider charge.

The payment base and the death benefit will be set equal to the contract value on the continuation date. The LBP and WP will be recalculated on the continuation date. The WP will be recalculated based on the age of the oldest covered life on the effective date of the spousal continuation. If the WP had previously been locked in, then it will become unlocked and can change based on the next withdrawal. The maximum contract value will be set to the contract value on the continuation date. If the covered life is greater than or equal to age 81 (or other predetermined age) at the time of the continuation, the rider will terminate. The death benefit will be equal to the contract value.

Joint/Spousal Continuation Election:

In the event that the contract owner dies and spousal continuation is elected, the contract value will increase to the DB value (the greater of the contract value and the DB). The spouse may do the following.

The spouse may elect to continue the contract and rider, in which event the existing rider will continue with respect to all benefits, at the current contract rider charge. The payment base will be equal to the greater of contract value or payment base on the continuation date. The LBP will be recalculated to equal the withdrawal percent multiplied by the greater of contract value or payment base on the continuation date. The maximum contract value will be the greater of the payment base or the contract value on the continuation date. The DB will be equal to the bumped up contract value on the continuation date.

The WP recalculation rule is as follows:

The WP will remain at the current percentage if there has been a partial surrender since the rider effective date.

If there has not been a partial surrender, the WP will be based on the attained age of the remaining covered life on the contract anniversary prior to the first surrender/withdrawal.

The contract owner cannot name a new owner on the contract. The contract owner can name a new beneficiary on the contract. Any new beneficiary added to the contract will not be taken into consideration as a covered life. The rider will terminate upon the death of the surviving covered life, or continue the contract and revoke the withdrawal feature of the rider. The charge is assessed on the revocation date, and then is no longer assessed.

The covered life will be re-determined on the date of the continuation date for death benefit purposes. If the covered life is greater than the age limitation at the time of continuation, the rider will terminate. The death benefit will be equal to contract value.

Effect of Death of the Owner or the Annuitant Before the Annuity Commencement Date The following tables describe the effect of death of the owner or the annuitant before the annuity commencement date for the single life election and the joint/spousal continuation election.

TABLE 1

Single Life Election:

| If the Deceased is | And... | And... | Then the... |
|---|---|---|---|
| Contract Owner | There is a surviving contract owner | The annuitant is living or deceased | Joint contract owner receives the DB, rider terminates |
| Contract Owner | There is no surviving contract owner | The annuitant is living or deceased | Rider terminates, designated beneficiary receives DB |
| Contract Owner | There is no surviving contract owner or beneficiary | The annuitant is living or deceased | Rider terminates, estate receives DB |
| Annuitant | Contract owner is living | There is no contingent annuitant and the contract owner becomes the contingent annuitant | Contract continues, no DB is paid, rider continues |
| Annuitant | Contract owner is living | There is no contingent annuitant and the contract owner waives their right become the contingent annuitant | Rider terminates, contract owner receives DB |
| Annuitant | Contract owner is living | Contingent annuitant is living | Contingent annuitant becomes annuitant and the contract and rider continues |
| Annuitant | Contract owner is non-natural person | There is no contingent annuitant | Contract owner receives DB, rider terminates |

TABLE 2

Joint/Spousal Continuation Election:

| If the Deceased is... | And... | And... | Then the... |
|---|---|---|---|
| Contract Owner | There is a surviving contract owner | The annuitant is living or deceased | The surviving contract owner continues the contract and rider, increase the contract value to the death benefit value. |
| Contract Owner | There is no surviving contract owner | The annuitant is living or deceased | If the spouse is the sole primary beneficiary, follow spousal continuation rules for joint life elections |
| Contract Owner | There is no surviving contract owner or beneficiary | The annuitant is living or deceased | Rider terminates, estate receives DB |
| Annuitant | Contract owner is non-natural person | | If the spouse is the sole primary beneficiary, follow spousal continuation rules for joint life elections |
| Annuitant | The owner is living | There is a living contingent annuitant | The rider continues; upon the death of the last surviving covered life, the rider will terminate. |

Contingent Annuitant Becomes Annuitant

If the annuitant dies where there is a contingent annuitant (who is different from the owner/annuitant), then the rider continues and all provisions of the rider remain the same, there are no resets nor DBs paid. Upon the death of the last surviving covered life, a DB is paid to the beneficiary, and the rider terminates.

Effect of Death after the Annuity Commencement Date.

The following tables describe the effect of death after the annuity commencement date for single life election and joint/spousal continuation election.

TABLE 3

Single Life Election:

| If the Deceased is | And... | And... | Then the... |
|---|---|---|---|
| Annuitant | The annuitant is also the contract owner | Fixed lifetime and period certain is elected | The lifetime contingency ceases. The remaining DB is paid under period certain. |

TABLE 4

Joint/Spousal Continuation Election:

| If the Deceased is... | And... | And... | Then the... |
|---|---|---|---|
| Annuitant | The annuitant is also the contract owner, and there is no surviving joint annuitant | Fixed lifetime and period certain is elected | The lifetime benefit ceases. The remaining DB is paid under period certain. |
| Annuitant | The annuitant is also the contract owner, and there is a surviving joint annuitant | Fixed joint and survivor lifetime and period certain is elected | Lifetime benefit continues until death of last surviving annuitant |

Fund Allocation Restrictions

Fund allocation and investment in any investment option may be restricted in the event of a change of covered life after six months. If the investment option restriction is imposed, a contract owner (may) have the following options. The contract owner may: (i) reallocate all existing money and all new premiums to a non-restricted investment option, an available asset allocation program, or fund-of-fund investment option from time to time; or (ii) revoke the withdrawal feature. If the restrictions are violated, the withdrawal feature will be revoked. The death benefit continues as is upon the date of revocation.

Aggregation.

For purposes of determining the PB under the rider, one or more deferred variable annuity contracts issued to the owner with the rider attached in the same calendar year may be treated as one contract. If the contracts are aggregated, the period over which withdrawals are measured against the payment benefit will change.

The effective date of the election until the end of the calendar year will be treated as a contract year for the purposes of the LBP limit. A pro rata rider charge will be taken at the end of that calendar year. As long as total withdrawals in that period do not exceed the LBP, the withdrawals will not necessitate a reset.

In future calendar years, the LBP limits will be aggregated and will be on a calendar year basis. In other words, withdrawals under all aggregated contracts in a calendar year will be compared against the combined LBP limits for the aggregated contracts. If withdrawals exceed those combined limits, the aggregate PB will be set to the combined contract values of the aggregated contracts. The LBP will then equal the withdrawal percent multiplied by the new PB.

If withdrawals do not exceed those combined limits, each withdrawal will reduce the PB dollar for dollar. The withdrawal benefits relating to the contract value reaching zero will not apply until the contract value of all aggregated contracts reaches zero. The rider charge will be taken at the end of each calendar year. It will be deducted pro rata from all of the sub-accounts and fixed accounts of the aggregated contracts. If the contract values of all aggregated contracts are reduced below the minimum account rules in effect, the annuity options as defined earlier in this specification will be offered. The options will pay the combined LBP.

Annuity Commencement Date

If the annuity reaches the maximum ACD, which is the later of the $10^{th}$ contract anniversary and the date the annuitant reaches age 90, the contract must be annuitized unless it is agreed upon to extend the ACD. In this circumstance, the contract may be annuitized under standard annuitization rules or, alternatively, under the rules applicable when the contract value is below the minimum account rules in effect. Note that the last option, a payout based on CV less than the minimum account rules, will result in an annuity based on the covered lives, not the annuitant. The contract value need not be below the minimum account rules at the ACD for the owner(s) to select this option.

Single Life Election:

A fixed lifetime and period certain payout will be issued. The lifetime portion will be based on the covered life determined at ACD. The covered life is the annuitant for this payout option. If there is more than one covered life then the lifetime portion will be based on both covered lives. The covered lives will be the annuitant and joint annuitant for this payout option. The lifetime portion will terminate on the first death of the two. The minimum amount paid to under this annuity option will at least equal the remaining DB under this rider.

If the oldest annuitant is age 59 (or other predetermined age) or younger, the date the payments begin will be automatically deferred until the oldest annuitant attains age 60 (or other predetermined age) and is eligible to receive payments in a fixed dollar amount until the later of the death of any annuitant or a minimum number of years. If the annuitant(s) are alive and age 60 (or other predetermined age) or older, each will receive payments in a fixed dollar amount until the later of the death of any annuitant or a minimum number of years. The minimum number of years that payments will be made is equal to the remaining DB under this rider divided by the product of the payment base on the ACD multiplied by the greater of the WP and 5% single (4½% joint/spousal).

$$\text{Single Election:} \quad \frac{DB}{PB \times \text{Max}(WP, 5\%)}$$

$$\text{Joint/Spousal Election:} \quad \frac{DB}{PB \times \text{Max}\left(WP, 4\frac{1}{2}\%\right)}$$

This annualized amount will be paid over the greater of the minimum number of years, or until the death of any annuitant, in the frequency that is elected. The frequencies will be among those offered by the issuing company at that time but will be no less frequently than annually. If, at the death of any annuitant, payments have been made for less than the minimum number of years, the remaining scheduled period certain payments will be made to the beneficiary. A lump sum option is not available.

Joint/Spousal Continuation Election:

The minimum amount paid to each annuitant under this annuity option will at least equal the DB under the rider. If the younger annuitant is alive and age 59 (or other predetermined age) or younger, the date that payments begin will be automatically deferred until the younger annuitant attains age 60 (or other predetermined age) and is eligible to receive payments in a fixed dollar amount until the death of the last surviving annuitant or a minimum number of years. If the annuitants are alive and the younger annuitant is age 60 or older, each will receive payments in a fixed dollar amount until the death of the last surviving annuitant or a minimum number of years. The minimum number of years that payments will be made is equal to the remaining DB under this rider divided by the LBP at annuitization.

This annualized amount will be paid over the greater of the minimum number of years, or until the death of the last surviving annuitant, in the frequency that each annuitant elects. The frequencies will be among those offered at that time but will be no less frequently than annually. If, at the death of the last surviving annuitant, payments have been made for less than the minimum number of years, the remaining scheduled period certain payments will be made to the beneficiary. A lump sum option is not available. If both spouses are alive, a fixed joint and survivor lifetime and period certain payout will be issued to the annuitant(s). The covered life and covered life's spouse will be the annuitant and joint annuitant for this payout option. The lifetime benefit will terminate on the last death of the two. If one spouse is alive, owner will be issued a fixed lifetime and period certain payout. The lifetime portion will be based on the covered life. The covered life is the annuitant for this payout option. The lifetime benefit will terminate on the last death of the covered life.

Revoking the Withdrawal Feature

Benefit Increase Option 1

At any time following the earlier of spousal continuation or fifth anniversary of the rider effective date, the contract owner may elect to revoke the withdrawal feature of the rider. The payment base will go to zero and the withdrawal percent will go to zero, and LBP will go to zero.

On the date the withdrawal feature is revoked, a pro rata share of the rider charge is equal to the rider charge percentage multiplied by the PB, multiplied by the number days since the last charge was assessed, divided by 365. The rider charge will be assessed on the revocation date, and then will no longer be assessed. The death benefit continues as is upon the date of the revocation. No other living benefit may be elected upon the revocation of the withdrawal feature.

Benefit Increase Option 2

The contract owner can not elect to revoke the withdrawal feature. However, the withdrawal feature can be revoked in certain circumstances. See specific sections on ownership and spousal continuation.

Additional Terms Relevant to the Annuity Contract(s)

Additional terms of the contract(s) or rider(s) include the following. The benefits under the contract cannot be assigned. If the free look provision under the contract is exercised, the rider will terminate. The employee gross-up is not considered premium for purposes of the payment base and death benefit. Payment enhancements are not considered premium for purposes of the payment base and death benefit. Front-end loads are not taken from the premium for purposes of the payment base and death benefit.

Subject to state approval, a rider will be made available on all currently available products issued on or after the date the rider is launched for sale in the state of issue. This does not imply post-issue election. Post-issue election will be determined on an as needed basis. See product requirements for a complete list.

Prior company approval is required on all subsequent premium payments received after the first 12 months. Any subsequent premium payment(s) which brings the total cumulative subsequent premiums in excess of $100,000 will not be accepted without prior approval. Payment enhancements and employee gross-up are not to be included in premium total.

Where post-issue election occurs, if the rider effective date is after the contract issue date, then the period between the rider effective date and the next contract anniversary will constitute a contract year.

The following is a more detailed description of the present invention to better understand the invention and description set forth supra. This detailed description is intended to be exemplary and is not limiting as to the scope of the claimed invention. The present invention comprises a data processing method for administering a deferred variable annuity contract having a step-up provision wherein the step-up is guaranteed at a predetermined percentage. The present data processing method is preferably in the form of a rider to a variable annuity contract wherein the rider provides that the annuity contract has a step-up provision. In another aspect of the invention, the present data processing method is not in the form of a rider, but is a part of the base contract. In exchange for paying higher fees, the relevant life receives several advantages by selecting the method and system of the present invention which provides a step-up provision and wherein the only restriction on the step-up provision is that the step-up is guaranteed at a predetermined percentage. The provider of the annuity contract of the present invention also enjoys advantages compared to prior art annuity contracts having step-up provisions. These advantages include the following.

The relevant life benefits because he/she enjoys a step-up provision of the payment base value while at the same time there are no restrictions on the asset allocations of the underlying investments. Therefore, the relevant life has the freedom to invest according to his or her prerogative. Further, if and when the payment base value is stepped-up, then the lifetime benefit payments are guaranteed to be at a higher minimum value (if the lifetime benefit payments are related to the value of the payment base and if the payment base value is not decreased by taking future withdrawals in excess of the lifetime benefit payment). Thus, there is a strong potential that the amount of the available guaranteed lifetime benefit payments will continue to increase over time if the relevant life continues to delay taking withdrawals. Further, although the lifetime benefit payments are initially based on the premium payment, it is important to note that the value of the lifetime benefit payments can grow over time without any additional financial outlay from the relevant life.

The provider of the annuity contract having the step-up provision benefits because it is able to manage the risk by controlling the volatility of the growth of the guarantee associated with the step-up provision because of the rising guarantee on the step-up. The ability to limit the guaranteed base provides a risk management measure that improves the financial security of the company. The rising guarantee on the step-up therefore reduces the risk caused by volatile equity markets.

When compared to an annuity contract that has a traditional step-up provision (providing a step-up to the payment base only if the contract value increases over a single time period), the present invention provides the following advantages. In the situation where the step-up may be guaranteed, the "catch-up" feature of the enhanced step-up provision provides the potential to reach the full account value growth if the markets remain positive. The present invention provides the potential to provide a step-up in a year where there is flat or negative market performance. The present invention provides the potential to have a higher guaranteed lifetime benefit payment than a traditional step-up product design that has a guaranteed step-up. If the guaranteed benefit base is the base to which the charge is applied, a slow progression of step-ups incurs lower fees during the step-up periods than a fully stepped-up design.

The present invention comprises a data processing method for administering a deferred variable annuity contract during the accumulation phase, the annuity contract having a payment base value, a contract value, and a step-up provision, comprising the steps of: (i) determining if a "step-up" in the present payment base value is applicable; and (ii) if the "step-up" is applicable, (1) determining a step-up, wherein the step-up is guaranteed at a predetermined percentage; and (2) if said step-up is greater than zero, increasing the present payment base value according to the following formula: new payment base value=present payment base value×(1+step-up).

In an alternative embodiment, the present invention comprises a system for administering a deferred variable annuity contract during the accumulation phase, the annuity contract having a payment base value, a contract value, and a step-up provision, comprising: a storage device; a processor coupled to the storage device, the storage device storing instructions that are utilized by the processor. The instructions stored in the storage device comprise: (i) receiving information from a relevant life in order to establish the deferred variable annuity contract; (ii) receiving lifetime benefit payment withdrawal requests from the relevant life; (iii) determining if a step-up in the present payment base value is applicable, wherein the "step-up" is applicable if the present contract value is greater than the previous period's payment base value; and (iv) if the step-up is applicable, (1) determining a step-up, wherein the step-up is guaranteed at a predetermined percentage; and (2) if said step-up is greater than zero, increasing the present payment base value according to the following formula: new payment base value=present payment base value×(1+step-up).

It should be understood that as used herein the term "periodically" in certain aspects may refer to only being performed once. In other aspects, "periodically" may refer to steps being performed more than once as described herein.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set routine (block 108), via the computer systems, as further specified in FIG. 3. Thereafter customer communication is established through the customer communication routine (block 110) as further specified in FIG. 4. The application processing routine ends at (block 112).

Figure 2:
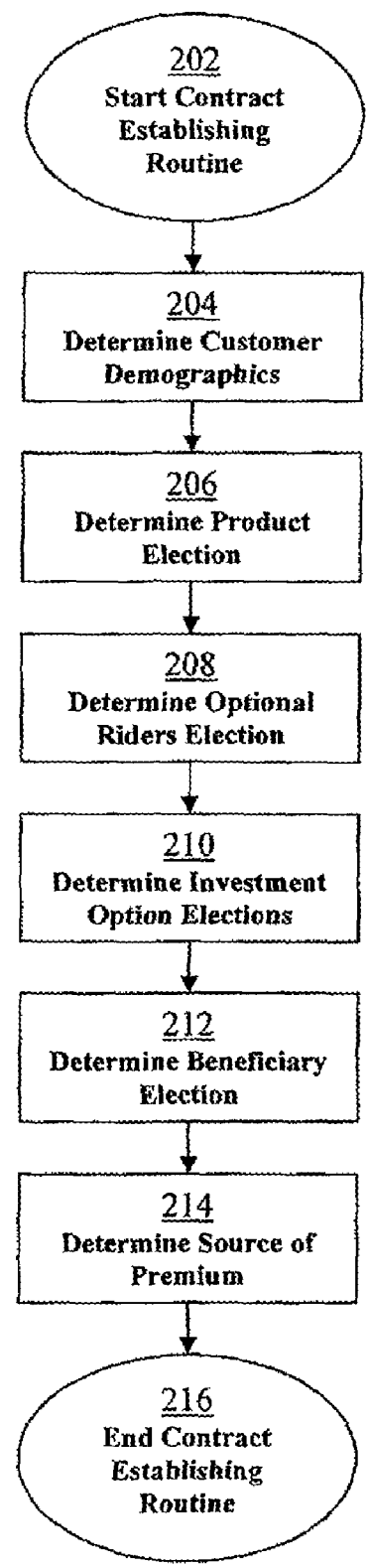
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission, and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products which each have different characteristics including the costs and fees as well as the liquidity features associated therewith. The election of optional riders is determined (block 208). For example, the optional riders may be elected from a group of different riders which each have various guaranteed withdrawal features. The election of investment options is determined (block 210). For example, the investment options include money market funds, bond funds, stock funds, and the like. The beneficiary is elected (block 212). In one aspect, this is the person who will collect the death benefits, if any. The source of the premium is determined (block 214). For example, the source of the premium may come from the relevant life's personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
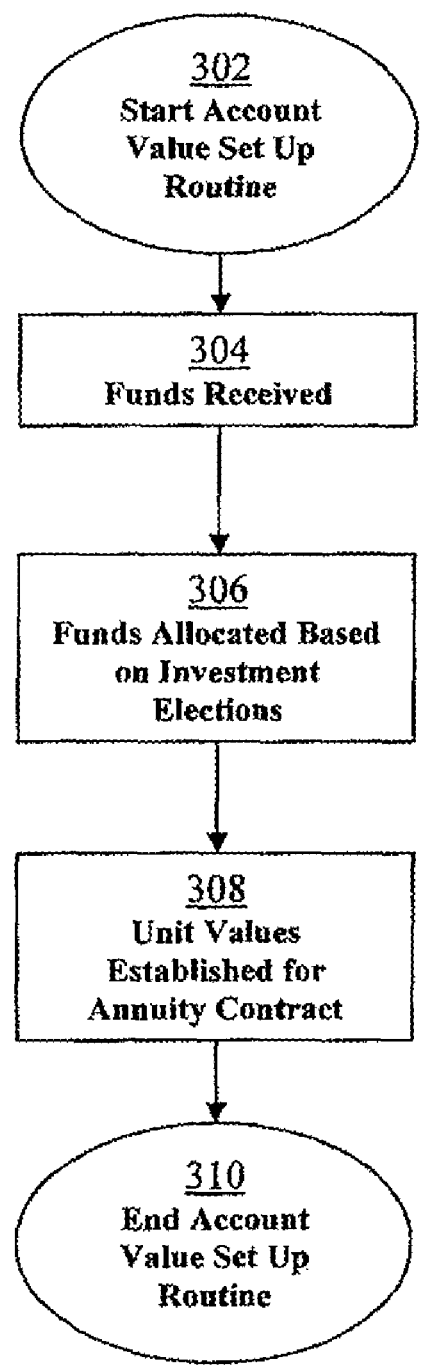
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life's annuity contract based on their specific fund allocations. For example the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
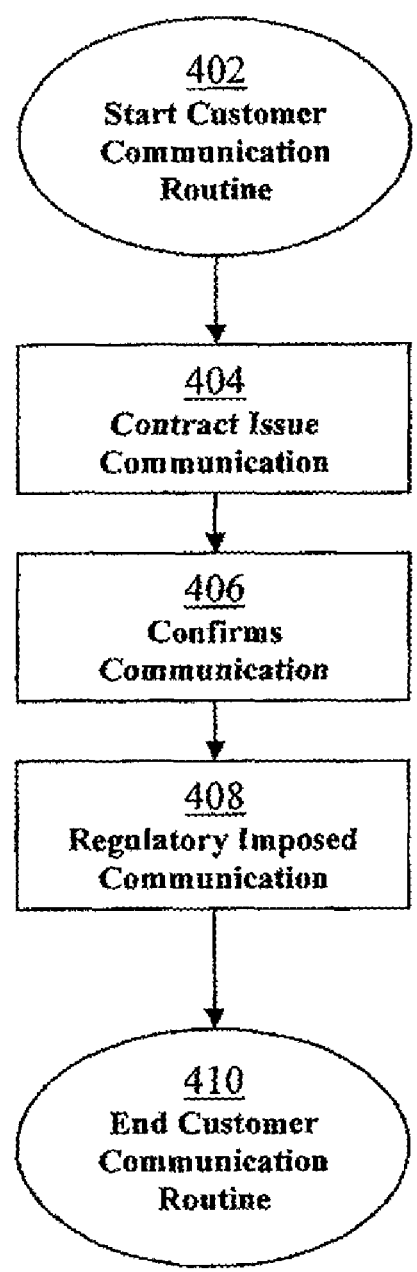
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408). It should be understood that the steps taken for establishing customer communication may proceed in various orders and that the order shown in FIG. 4 is for illustrative purposes only and is only one embodiment of said steps. The customer communication routine ends at (block 410).

Figure 5:
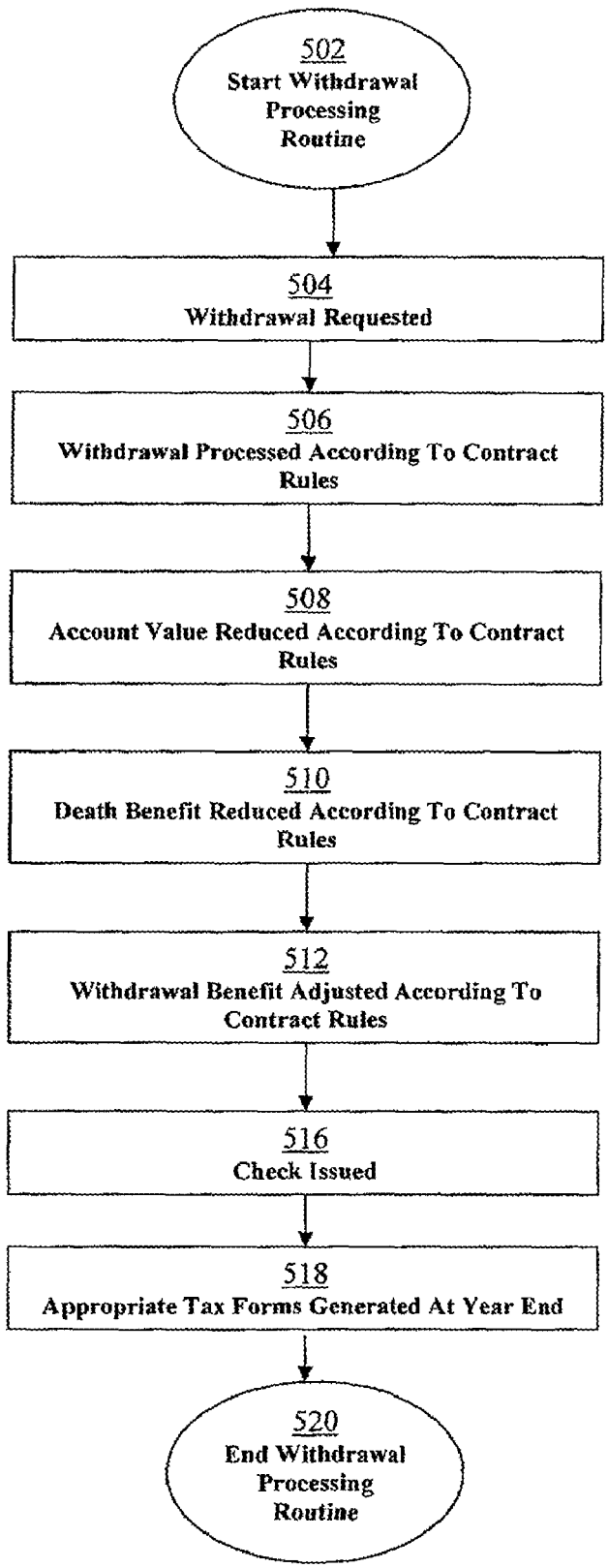
FIG. 5 is a flow chart illustrating the appropriate steps after a withdrawal is requested.

FIG. 5 is a flow chart illustrating the appropriate steps after a withdrawal is requested. The withdrawal processing routine starts at (block 502). A withdrawal is first requested by the relevant life at (block 504). The withdrawal is then processed according to the contract rules (block 506). The contract rules are embedded in a computer system or the like and vary according to the type of annuity contract. For example, in certain embodiments, a requested withdrawal amount by the relevant life may be limited by the contract rules to a specific withdrawal percent that is applied by the computer system, and wherein the contract rules specify the withdrawal percent according to the age of the relevant life or the number of years since the contract was established. Therefore, the contract rules govern the data flow in the computer system. The contract rules are administratively built into the computer system to obviate the need for manual intervention by the insurance company. The account value is reduced according to the contract rules (block 508). The death benefit is reduced according to the contract rules (block 510). The withdrawal benefit is adjusted according to the contract rules (block 512). The check or other form of payment is issued (block 516). The appropriate tax forms are generated at year end (block 518). It should be understood that the steps taken for processing withdrawals may proceed in various orders and that the order shown in FIG. 5 is for illustrative purposes only and is only one embodiment of said steps. The withdrawal processing routine ends at (block 520).

Figure 6:
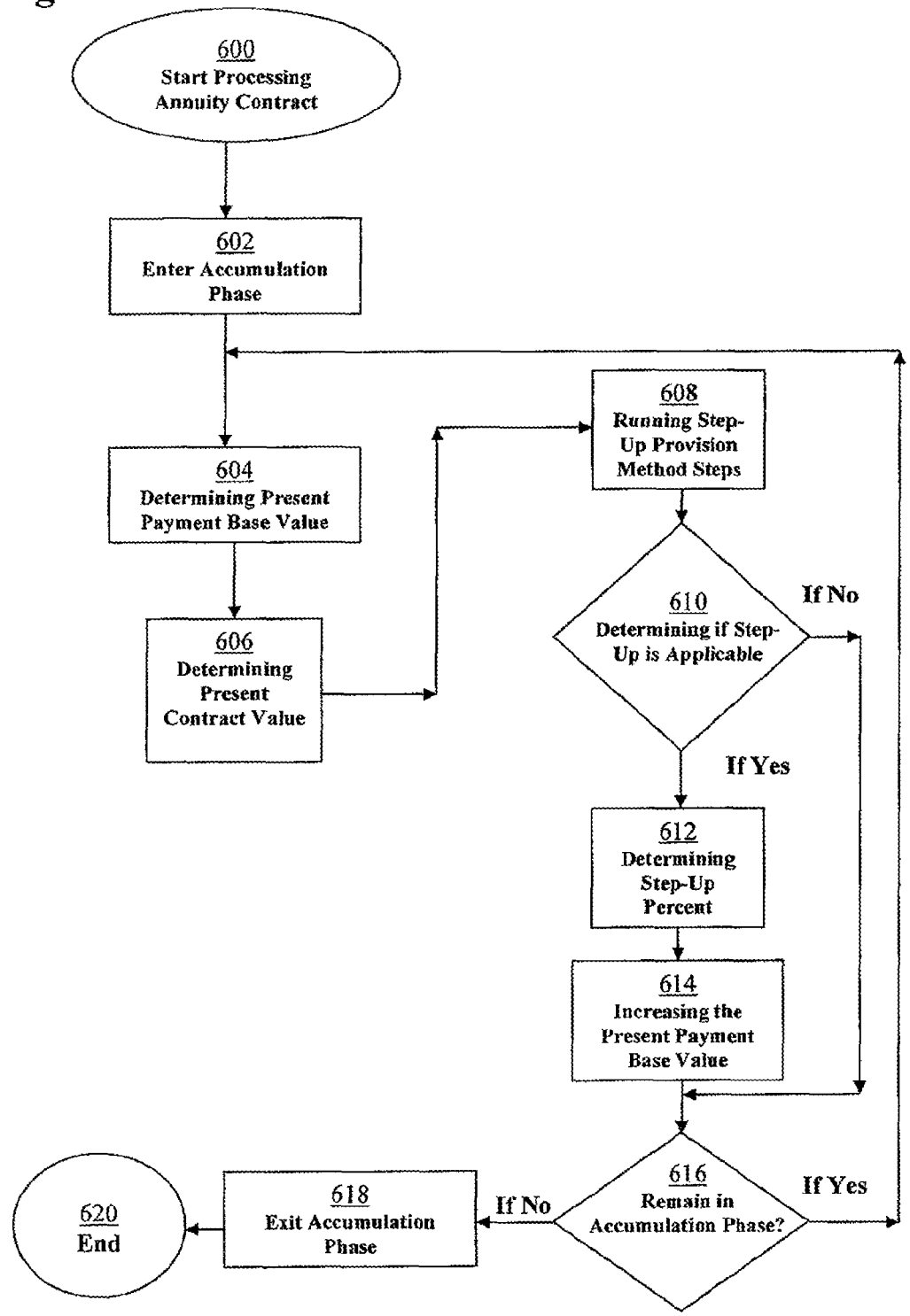
FIG. 6 is a flow chart illustrating a preferred embodiment of the present invention comprising a data processing method for administering an annuity contract.

FIG. 6 is a flow chart illustrating a preferred embodiment of the present invention comprising a data processing method for administering an annuity contract. It should be understood that the order of the successive method steps is shown for the sake of illustrating but one example and that the order of method steps can proceed in any variety of order. In one embodiment of the present invention, the invention comprises a data processing method for administering a deferred variable annuity contract during the accumulation phase, the annuity product having a payment base value, a contract value, and a step-up provision. The present method begins at step 600. At which point, the present method then enters the accumulation phase (block 602), which is typically when the contract has been signed by the relevant life and becomes effective. The present method determines a present payment base value for said annuity contract (block 604). In one embodiment, the present payment base value is a function of the premium payments and withdrawals by the relevant life. The present method determines a present contract value for the annuity contract (block 606). Next, the method runs the step-up provision method steps (block 608). The method determines if a step-up in the present payment base value is applicable (block 610). If a step-up is not applicable, then no action occurs and the method will proceed to (block 616) without increasing the present payment base value and will wait until the next time to re-determine if a step-up is applicable at that time. If a step-up is applicable, then the method determines a step-up amount (block 612), wherein the step-up amount is guaranteed at a predetermined percentage. If the step-up amount is greater than zero, the method increases the present payment base value (block 614). Preferably, the present payment base value is increased according to the following formula:

$$\text{New payment base value} = (\text{present payment base value}) \times (1 + \text{step-up}).$$

The present method then determines whether the annuity will remain in the accumulation phase (block 616). If the contract remains in the accumulation phase, then the method steps will be repeated at the start of the next time period. If the contract will not remain in the accumulation phase, then the contract will exit the accumulation phase (block 618) where the process eventually ends at step 620.

Figure 7:
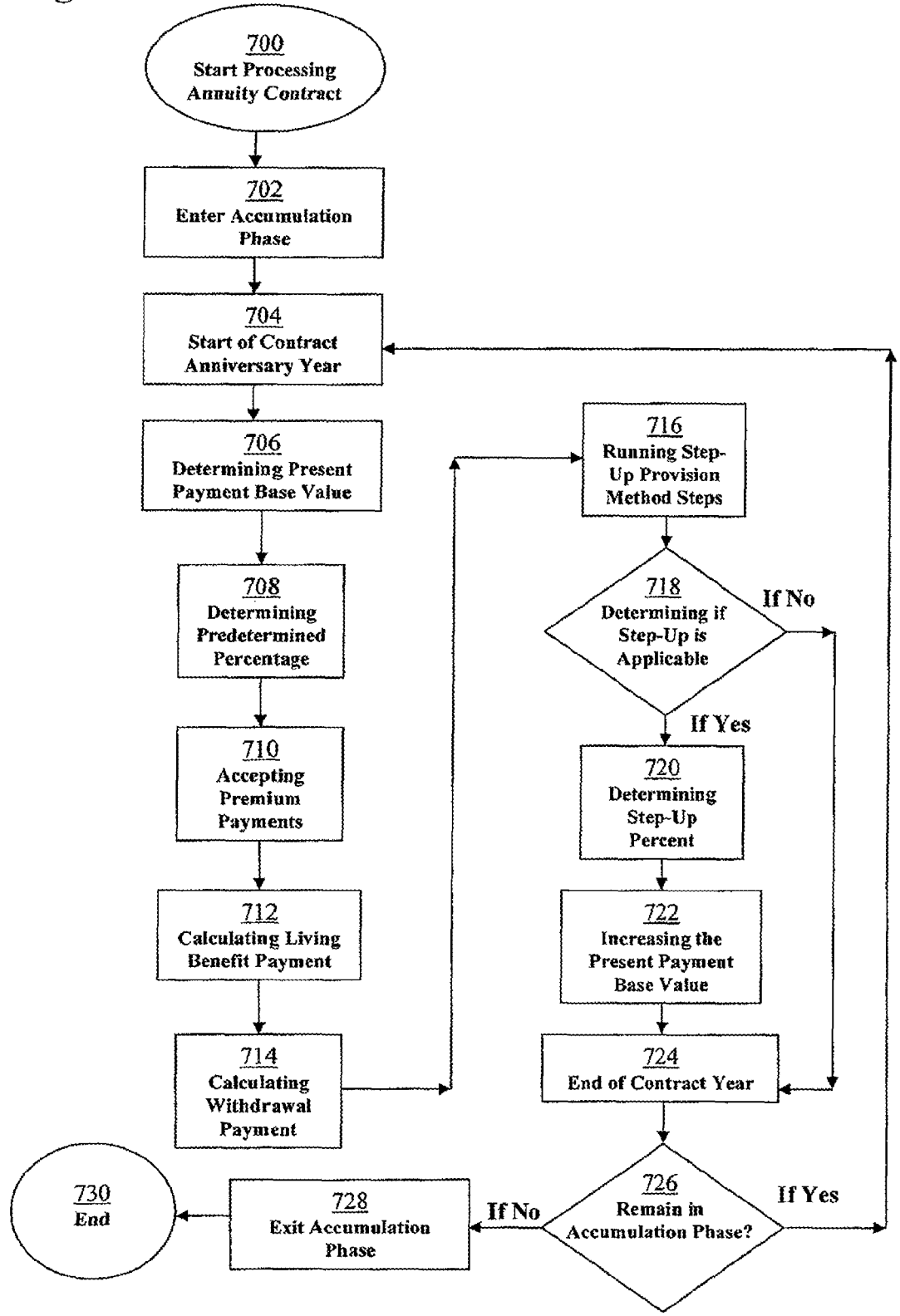
FIG. 7 is a flow chart illustrating an alternative embodiment of the present invention comprising a data processing method for administering an annuity product for a relevant life.

FIG. 7 is a flow chart illustrating an alternative embodiment of the present invention comprising a data processing method for administering an annuity contract. It should be understood that the order of the successive method steps is shown for the sake of illustrating but one example and that the order of method steps can proceed in any variety of order. In one embodiment of the present invention, the invention comprises a data processing method for administering a deferred variable annuity contract during the accumulation phase, the annuity product having a payment base value, a contract value, and a step-up provision. The present method begins at step 700. At which point, the present method then enters the accumulation phase (block 702), which is typically when the contract has been signed by the relevant life and becomes effective. At the start of each contract anniversary year (block 704), the method steps are performed as follows. It should be noted that the time periods may be separated into other time periods such as each month, each quarter, etc. or any other time interval. The present method determines a present payment base value for said annuity contract (block 706). In one embodiment, the present payment base value is a function of the premium payments and withdrawals by the relevant life. The present method determines a predetermined percentage for the annuity contract (block 708), wherein the step-up is guaranteed at the predetermined percentage. If requested by the relevant life, the present method will periodically accept premium payments from the relevant life (block 710) which increase the payment base value and the contract value. If requested by the relevant life and the covered life is older than a predetermined age (i.e. 60 years old), the present method will periodically calculate a lifetime benefit payment for the relevant life (block 712) which decreases the contract value. If requested by the relevant life, the present method will periodically calculate a withdrawal payment (block 714)—that is in excess of the lifetime benefit payment—for the relevant life which decreases each of the contract value and the payment base value. Next, the method runs the step-up provision method steps (block 716). The method determines if a step-up in the present payment base value is applicable (block 718). If a step-up is not applicable, then no action occurs and the method will enter the next contract year (or other time period) without increasing the payment base value and will wait until the next contract anniversary date (or other date) to re-determine if a step-up is applicable at that time. If a step-up is applicable, then the method determines a step-up amount (block 720), wherein the step-up amount is guaranteed at the predetermined percentage from (block 708). If the step-up amount is greater than zero, the method increases the present payment base value (block 722). Preferably, the present payment base value is increased according to the following formula:

$$\text{New payment base value} = (\text{present payment base value}) \times (1 + \text{step-up}).$$

At the end of the contract year or other time period (block 724), the present method then determines whether the annuity will remain in the accumulation phase (block 726). If the contract remains in the accumulation phase, then the method steps will be repeated at the start of the next contract anniversary year or other time period (block 704). If the contract will not remain in the accumulation phase, then the contract will exit the accumulation phase (block 728) where the process eventually ends at step 730.

It should be understood that several of the method steps of the present invention (for example blocks 706 and 708) require the input of a computer determine the respective values. In other words, a computer is required to use the method of the present invention in order to process the calculations and appropriate data records in accordance with the present invention. For example, in one embodiment of the present invention, the payment base value is related to premium payments by the relevant life, wherein the premium payments are determined by a computer. In one embodiment, the step-up is dependent on a predetermined percentage. Preferably, the predetermined percentage is fixed. The annuity commencement date is fixed and has certain restrictions. The initial guaranteed death benefit amount is also determined by a computer pursuant to the present invention. Preferably, the initial guaranteed death benefit amount is set for calculation purposes. In a preferred embodiment, the initial guaranteed death benefit amount is equal to the payment base value.

Determining if Step-Up is Applicable

In one embodiment the step-up is applicable if the present contract value is greater than the previous period's payment base value. In one embodiment, the step-up is applicable only if the present contract value is greater than a predetermined threshold, which may be referred to as a "high water mark". Preferably, the high water mark is equal to the previously highest attained contract value as determined at periodic time intervals. In a preferred embodiment, the "high water mark" rules do not apply. Alternatively, the high water mark is equal to the previously highest attained contract value (minus rider fee) as determined at periodic time intervals. Other formulas may be utilized for determining if a step-up is applicable.

In a preferred embodiment, the "step-up" is applicable if the present contract value is greater than the previous year's payment base value. By awarding the step-up if the present contract value is greater than the previous year's payment base value, the relevant life is able to have the potential to realize the growth of the contract value that may have been guaranteed by the predetermined percentage in prior years.

In one embodiment, at each year's contract anniversary or other time interval, a step-up will only occur if the present contract value is greater than the contract value of each previous year (minus the rider fee). As used herein, the term "high water mark" may be used to define the previously highest contract value (minus the rider fee) at each contract anniversary. In another embodiment, the step-up does not take place unless the present contract value is greater than the previous period's payment base value. Once the relevant life begins taking withdrawals and/or benefit payments, it becomes much more difficult to experience a step-up in the payment base because any appreciation of the underlying investments would have to outperform the amount of the withdrawals and/or benefit payments.

In a preferred embodiment, a step-up will only occur if the present contract value is greater than the contract value of each previous year minus the rider fee. As used herein, the term "high water mark" may be used in one embodiment to define the previously highest contract value minus the rider fee at each contract anniversary or other value. In another embodiment, the step-up does not take place unless the present contract value is greater than the present payment base value. In any case, if there is a period of decline of the contract value, and then later there is one period that the contract value increases, the step-up will not occur unless that one period's increase results in the present contract value being greater than not only the previous year's contract value minus the rider fee, but also the high water mark. For example, once a relevant life starts to take withdrawals, he/she will not benefit from an increase in the contract value in any given period unless that increase results in a present contract value that is greater than the high water mark as determined at periodic time intervals. Accordingly, once the relevant life begins taking withdrawals and/or benefit payments, it becomes much more difficult to experience a step-up in the payment base value because any appreciation of the underlying investments would have to outperform the amount of the withdrawals and/or benefit It should be noted that the step-up is applicable if the underlying investments perform well and appreciate, and does not apply simply from an increase in the contract value because of additional premium payments. (Additional premium payments would presumably increase the payment base nonetheless.) Therefore, any additional premium payments do not specifically affect the step-up provision.

Determining Step-Up

In one embodiment the step-up is determined according to the following formula:

Step-up=(the present contract value/previous year's contract value)−1.

In another embodiment, the step-up is determined according to the following formula:

Step-up=(the present contract value/(previous year's contract value−a rider fee))−1.

The rider fee is determined according to the following formula:

Rider fee=(a rider charge percentage)×(the previous year's payment base value).

The rider charge percentage is in the range of 0% to 100% and preferably in the range of 0% to 10%. Other formulas may be utilized for determining the step-up.

Regardless of the formula used to determine the step-up, the step-up is guaranteed at a predetermined percentage. The predetermined percentage is in the range of 0% to 100%; preferably in the range of 0% to 50%. The predetermined percentage is selected in order to manage the risk by controlling the volatility of the growth of the guarantee associated with the step-up provision.

Figure 8:
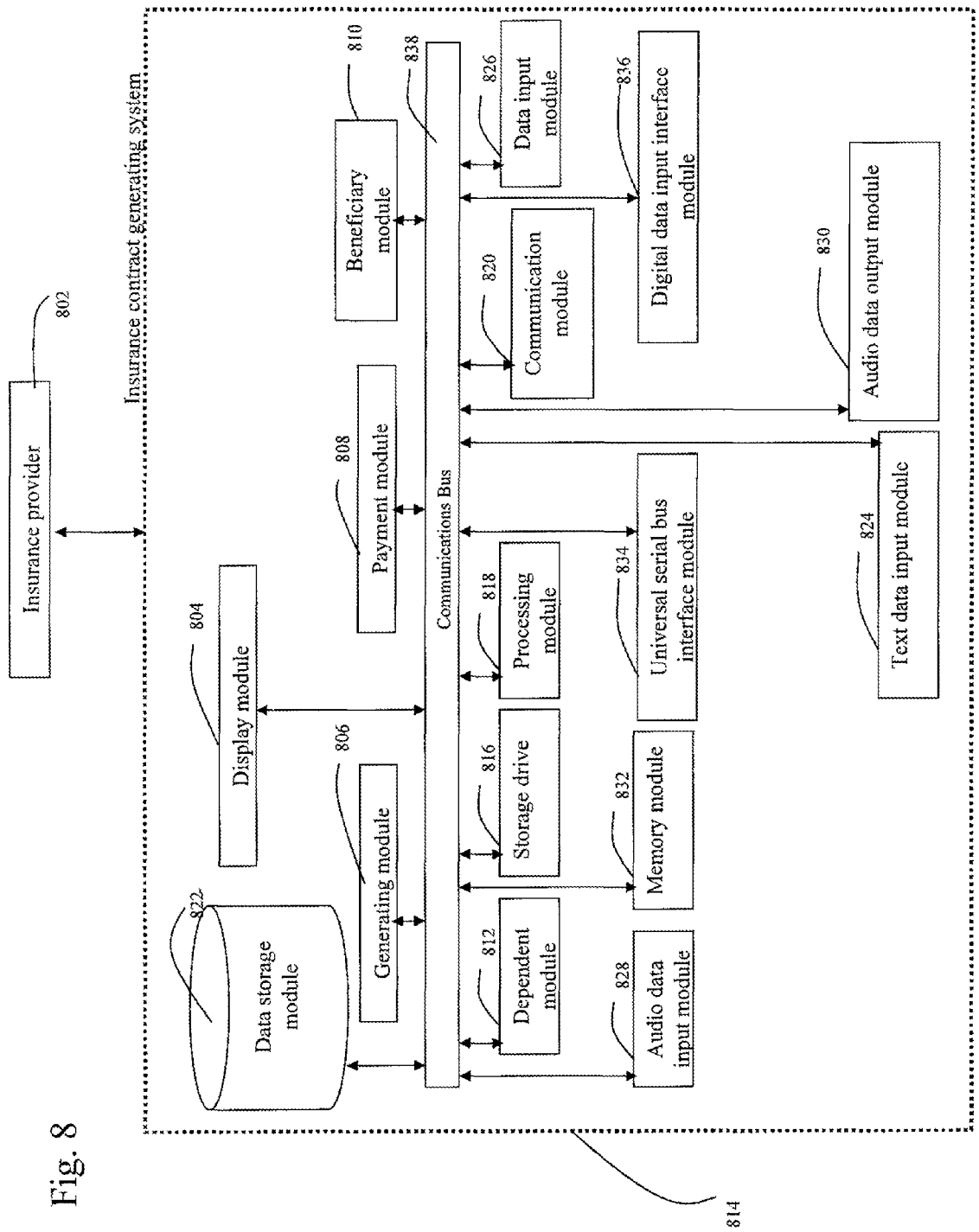
FIG. 8 is a diagram illustrating the system on which the present invention is implemented in accordance with an embodiment of the present invention.

Referring next to FIG. 8, depicted is a preferred embodiment of a system on which the methods of the present invention may be implemented. In one example of the preferred embodiment, the insurance contract generating system 814 would generally be used by an insurance provider 802, however the system may be operated by any individual or organization offering an insurance product as outlined in the present specification without departing from the spirit of the present invention. System 814 may be implemented in many different ways such as part of a single standalone server or as a network server or servers which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor. In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

In the preferred embodiment, all of the modules described herein are operably inter-connected via a central communications bus 838. The communications bus 838 is able to receive information from each of the modules, as well as to transmit information from one module to another. The insurance contract generating system 814 further includes a display module 804, and a generating module 806. The generating module is used for generating an insurance contract, wherein the insurance contract provides coverage to an individual or group for at least one event defined in the insurance contract.

The insurance contract generating system 814 additionally includes a payment module 808 for making payments to an insured individual or group for a predetermined period of time as defined by the deferred annuity insurance contract.

The system further comprises a beneficiary module 810 for choosing a beneficiary to receive payments from the insurance provider in the instance of an insured individual's death. Furthermore, the system comprises a dependent module 812 for offering an insurance contract structured according to the methods of the present invention to dependents of an individual eligible for the insurance contract described herein.

Additionally, the insurance contract generating system 814 includes: a storage drive 816 for receiving data stored on a storage disc, a processing module 818 for processing digital data received by and contained in the insurance contract generating system 814, a communication module 820 for bi-directional communication with external and telecommunications systems, a data storage module 822 for storing and managing digital information, a text data input module 824 for inputting data in the form of text, and a data input module 826 for converting to digital format documents and images and inputting them into the insurance contract generating system 814.

Finally, the insurance contract generating system 814 includes: an audio data input module 828 for receiving and inputting audio information, an audio data output module 830 for outputting data in audio format (i.e. recorded speech, synthetically generated speech from digital text, etc), a memory module 832 for temporarily storing information as it is being processed by the processing module 818, a universal serial bus interface module 834 for receiving and transmitting data to and from devices capable of establishing a universal serial bus connection, and a digital data input interface module 836 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step up percent, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

For example, a user provides instructions for the amount of the living benefit payment that is requested. It should be understood that the user may communicate with the computing system directly or indirectly through another party, such as the insurance provider 802. In the event the user communicates with insurance provider 802, the insurance provider 802 than receives and transfers information, to and from the insurance contract generating system 814 via the text data input module 824, audio data input module 828, audio data output module 830 and the display module 804. As used herein the data storage module 822 is also referred to as a storage device. The processing module 818 is contained within the insurance contract generating system 814, which is coupled to the storage device, the storage device stores instructions that are utilized by the processor. The instructions comprise: (i) an instruction for determining if a step-up in the present payment base value is applicable, wherein the step-up is applicable if the present contract value is greater than the previous year's payment base value; (ii) if the step-up is applicable, (a) determining a step-up, wherein the step-up is guaranteed at a predetermined percentage; (b) if said step-up is greater than zero, increasing the present payment base according to the following formula: new payment base value=(present payment base value)×(1+step-up).

Figure 9:
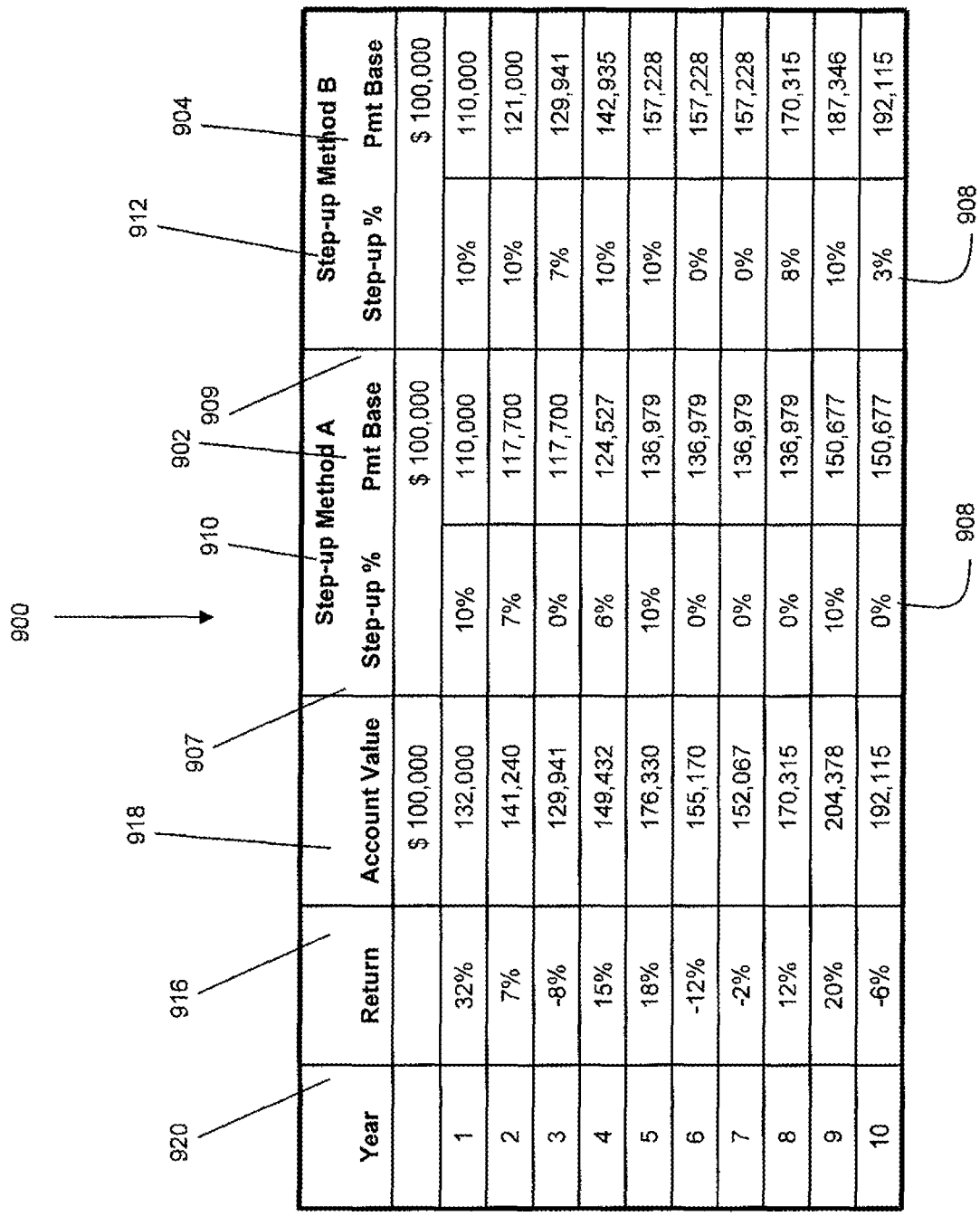
FIG. 9 depicts a table illustrating payment base values as a function of time for annuities associated with various step-up determining methods of the preferred embodiment.

FIG. 9 shows a table 900 illustrating exemplary payment base values 902 and 904 as a function of time for annuities associated with various step-ups 908, which are illustrated in "step-up %" columns 907 and 909 as shown within "Step-up Method A" column 910 and "Step-up Method B" column 912, respectively. In this example, FIG. 9 compares two different step-up methods: Step-up Method A and Step-up Method B. The values obtained by using the respective methods are illustrated within their respective columns 910 and 912. The preferred method of the preferred embodiment of the present invention is Step-up Method B. Additionally, as shown in the first row of "Account Value" column 918, the initial investment for this example is $100,000. "Return" column 916 illustrates the hypothetical annual return as a percentage of the account value as illustrated in "Account value" column 918. The percentages within "Return" column 916 are shown as a positive percentage or a negative percentage for account value growth or decline, respectively. "Account Value" column 918 illustrates the hypothetical account value for each contract year. The years are tracked in "Year" column 920. For example, with step-up Method A, step-up 908 is applicable if: (i) the present account value is greater than the previous year's account value; and (ii) the present account value is greater than the previously highest attained account value, known as the "high water mark". If step-up 908 is applicable the account value is increased by step-up 908. Step-up 908 is equal to the present account value divided by the previous year's account value minus 1. Step-up 908 is preferably a rising guarantee, however the maximum step-up 908 for any given year is 10%. For example, although the account value increases by 32% at year 1, the payment base value 902 is only increased by 10% because of the 10% rising guarantee 908. Using these rules, "Step-up Method A" column 910 illustrates step-up 908 and new payment base value 902 for each year according to the hypothetical performance of the account value represented by "Account Value" column 918. It is important to note that the "high water mark" rules as described herein are applied in the example above regarding Step-up Method A with respect to FIG. 9. For example, a step-up will not occur unless the account value increases above the previously highest account value, i.e. the "high water mark". If the account value decreases for any given year, the payment base does not increase and it does not decrease. Moving to step-up method B, step-up 908 is applicable if the present account value represented in "Account Value" column 918 is greater than the previous year's payment base value 904. Preferably, the "high water mark" rules do not apply with step-up method B. If a step-up is determined to be applicable, the account value is increased by step-up 908. Step-up 908 is equal to the present account value divided by the previous year's payment base value 904 minus 1. Step-up 908 is preferably a rising guarantee, however the maximum step-up 908 for any given year is 10%. For example, although the account value increases by 32% at year 1, the payment base value 904 is only increased by 10% because of the 10% rising guarantee 908. Using these rules, "Step-up Method B" column 912 illustrates step-up 908 and new payment base value 904 for each year according to the hypothetical performance of the account value.

Turning to FIG. 10, shown is table 1000, which corresponds with the data in table 900 of FIG. 9. Table 1000 illustrates hypothetical lifetime benefit payments, which correspond to the payment base values 902 and 904 from "Step-up Method A" column 910 and "Step-up Method B" column 912 within table 900 of FIG. 9, respectively. The formula used to calculate the lifetime benefit payment amounts is: Lifetime Benefit Payment=Withdrawal Percent×Payment Base, wherein the Withdrawal Percent is 5%. As previously described, the withdrawal percent is used to determine the amount of the lifetime benefit payment. The withdrawal percent is determined at the later of: (i) the attained age of the covered life on the most recent contract anniversary prior to the first withdrawal, or (ii) the contract anniversary immediately following the covered life's $60^{th}$ birthday (or other predetermined age). In this case, the withdrawal percent was chosen arbitrarily. "Original Payment Base" column 1004 illustrates the hypothetical lifetime benefit payments according to no step-up provision of the payment base. "Step-up Method A" column 1006 illustrates the hypothetical lifetime benefit payments according to the rules of the Step-up Method A, as described above with respect to FIG. 9. "Step-up Method B" column 1008 illustrates the hypothetical lifetime benefit payments according to the rules of the Step-up Method B, as described above with respect to FIG. 9. The years are tracked in "Year" column 1002.

Figure 11:
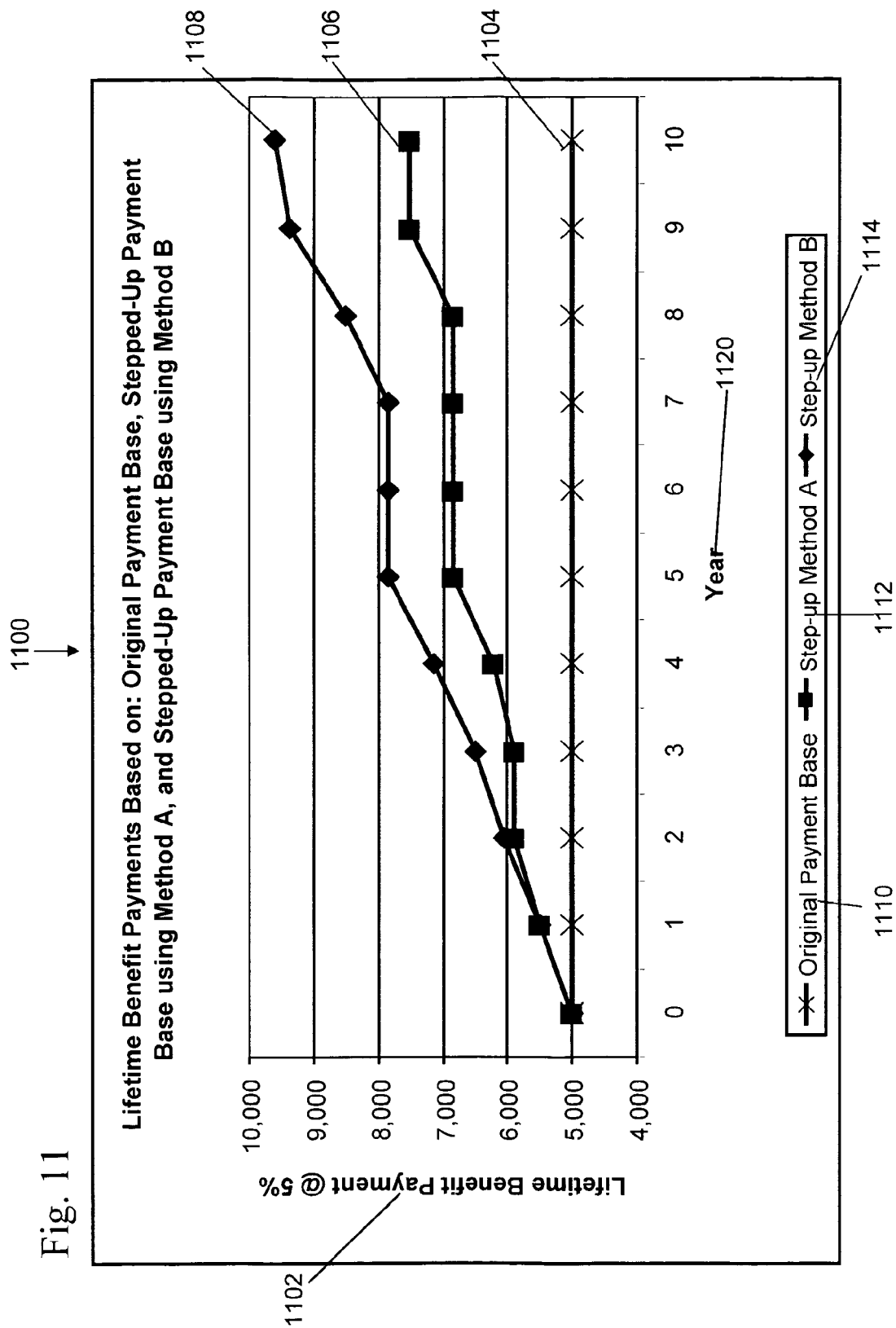
FIG. 11 depicts a graph illustrating guaranteed lifetime benefit payment amounts as a function of time for annuities associated with various step-up determining methods of the preferred embodiment as described in FIG. 9 and FIG. 10.

FIG. 11 depicts graph 1100, which further illustrates the effect of various step-up method rules and corresponds to the data provided by both table 900 of FIG. 9 and table 1000 of FIG. 10. More specifically, graph 1100 illustrates the effects of the rules provided by step-up method A, step-up method B, and a method without a step-up provision as a function of time. Furthermore, graph 1100 includes a "Guaranteed Lifetime Benefit @ 5%" scale 1102, which illustrates "Guaranteed Lifetime Benefit @ 5%" values 1104, 1106, and 1108 as a function of time 1120 for annuities associated with step-up methods 1110, 1112, and 1114 respectively. The function of time 1220 is measured in years and is illustrated on the x-coordinate of graph 1100 so as to accurately correspond to table 1000 of FIG. 10. For example, graph 1100 illustrates step-up method A as a line with a square symbol, which initially starts at a "Guaranteed Lifetime Benefit @ 5%" value 1106 of $5,000. At year 1, as displayed on graph 1100, step-up method A 1112 shows a positive incline from year 0 and illustrates a "Guaranteed Lifetime Benefit @ 5%" value 1106 of $5,500, which accurately corresponds to the appropriate values represented in table 1000 of FIG. 10. Further, as illustrated in graph 1100, step-up method 1112 continues to positively incline and stabilize in accordance to the values represented in "Step-up Method A" column 1006 as depicted in table 1000 of FIG. 10. Accordingly, so long as the investment results in a positive return at some period during the annuity contract, then the "Guaranteed Lifetime Benefit Payment Amount" will step-up and never decrease until the payment base is decreased due to withdrawals. Additionally, as illustrated by graph 1100, the lifetime benefit payments are the highest when using the rules of step-up Method B. Conversely, the lifetime benefit payments are the lowest when there is no step-up provision in place for the payment base. Therefore, when compared to step-up method A or to a method with no step-up provision at all, step-up method B provides the relevant life with the potential for greater lifetime benefit payments, which is illustrated by the preferred embodiment of the present invention.

The following description and examples further illustrate the preferred features of the present invention.

The present invention comprises a data processing method for administering a deferred variable annuity contract during the accumulation phase, the annuity contract having a payment base, a contract value, and a step-up provision, comprising the steps of: (i) determining if a "step-up" in the present payment base is applicable; (ii) if the "step-up" is applicable, (1) determining a step-up, wherein the step-up is guaranteed at a predetermined percentage; (2) if said step-up is greater than zero, increasing the present payment base by using the following formula: New Payment Base=Present Payment Base×(1+Step-up).

In a preferred embodiment, the "step-up" is applicable if the present contract value is greater than the previous year's payment base. By awarding the step-up if the present contract value is greater than the previous year's payment base (rather than, for example, the previous year's contract value), the relevant life is able to have the potential to realize the growth of the contract value that may have been guaranteed by the predetermined percentage in prior years. That is, the payment base may continue to enjoy a "step-up" even if the contract value has not changed from the previous year, or even if the contract value has decreased from the previous year. This still benefits the company issuing the contract because the "step-up" is smoothed out because of the predetermined percentage which sets a yearly guarantee to the step-up. However, the payment base may continue to "step-up" over several years to realize the growth in the contract value that may have been guaranteed in prior years because of the predetermined percentage. In other words, the payment base can "catch-up" to the growth of the contract value that was guaranteed in previous step-ups in earlier years.

Example 1

The following example illustrates one embodiment of the present method and system. The following starting parameters are set for the following example. Such starting parameters are strictly for the purposes of illustration. For example, the predetermined percentage may be in the range of 0% to 100%, and more preferably in the range of 0% to 50%. Further, the rider charge may be in the range of 0% to 100%, and more preferably in the range of 0% to 10%.

Predetermined Percentage=10%
Step-Up=AV(t)/(PB(t−1))−1
AV(t)=Present Contract Value
PB (t−1)=Previous Year's Payment Base
New Payment Base=Present Payment Base×(1+Step-Up)

| Period Ended | Premium Payment | Contract Value | Payment Base |
|---|---|---|---|
| Mar. 31, 1983 | 100,000 | 100,000 | 100,000 |
| Mar. 31, 1984 | — | 120,000 | 110,000 |
| Mar. 31, 1985 | — | 120,000 | 120,000 |
| Mar. 31, 1986 | — | 100,000 | 120,000 |
| Mar. 31, 1987 | — | 115,000 | 120,000 |
| Mar. 31, 1988 | — | 150,000 | 132,000 |
| Mar. 31, 1989 | — | 175,000 | 145,200 |
| Mar. 31, 1990 | — | 160,000 | 159,720 |
| Mar. 31, 1991 | — | 165,000 | 165,000 |

Calculation for Mar. 31, 1984 (first year contract anniversary):
Present Contract Value=120,000
Previous Year's Payment Base=100,000
Step-Up does apply because present contract value (120,000) is greater than (previous year's Payment Base) (100,000).
Step-Up=(120,000/100,000)−1=0.200=20.0%
Step-Up is guaranteed at 10%
New Payment Base=100,000×1.10=110,000.
Calculation for Mar. 31, 1985 (second year contract anniversary):
Present Contract Value=120,000
Previous Year's Payment Base=110,000
Step-Up does apply because present contract value (120,000) is greater than (previous year's Payment Base) (110,000).
Step-Up=(120,000/110,000)−1=0.09091=9.091%
New Payment Base=110,000×1.09091=120,000.1
New Payment Base (rounded to nearest dollar)=120,000
Calculation for Mar. 31, 1986 (third year contract anniversary):
Present Contract Value=100,000
Previous Year's Payment Base=120,000
Step-Up does not apply because present contract value (100,000) is not greater than (previous year's Payment Base) (120,000).
Calculation for Mar. 31, 1987 (fourth year contract anniversary):
Present Contract Value=115,000
Previous Year's Payment Base=120,000

Step-Up does not apply because present contract value (115,000) is not greater than (previous year's Payment Base) (120,000).

Calculation for Mar. 31, 1988 (fifth year contract anniversary):
Present Contract Value=150,000
Previous Year's Payment Base=120,000
Step-Up does apply because present contract value (150,000) is greater than (previous year's Payment Base) (120,000).
Step-Up=(150,000/120,000)−1=0.25000=25.000%
Step-Up is guaranteed at 10%
New Payment Base=120,000×1.10=132,000
Calculation for Mar. 31, 1989 (sixth year contract anniversary):
Present Contract Value=175,000
Previous Year's Payment Base=132,000
Step-Up does apply because present contract value (175,000) is greater than (previous year's Payment Base) (132,000).
Step-Up=(175,000/132,000)−1=0.32575=32.575%
Step-Up is guaranteed at 10%
New Payment Base=132,000×1.10=145,200
Calculation for Mar. 31, 1990 (seventh year contract anniversary):
Present Contract Value=160,000
Previous Year's Payment Base=145,200
Step-Up does apply because present contract value (160,000) is greater than (previous year's Payment Base) (145,200).
Step-Up=(160,000/145,200)−1=0.10193=10.193%
Step-Up is guaranteed at 10%
New Payment Base=145,200×1.10=159,720
Calculation for Mar. 31, 1991 (eighth year contract anniversary):
Present Contract Value=165,000
Previous Year's Payment Base=159,720
Step-Up does apply because present contract value (165,000) is greater than (previous year's Payment Base) (159,720).
Step-Up=(165,000/159,720)−1=0.03306=3.306%
New Payment Base=159,720×1.03306=165,000.34
New Payment Base (rounded to nearest dollar)=165,000

In the preferred embodiment, at each year's contract anniversary, a step-up will only occur if the present contract value is greater than the contract value of each previous year minus the rider fee. As used herein, the term "high water mark" may be used to define the previously highest contract value minus the rider fee at each contract anniversary. In another embodiment, the step-up does not take place unless the present contract value is greater than the present payment base value. In any case, if there is a period of decline of the contract value, and then later there is one year that the contract value increases, the step-up will not occur unless that one year increase results in the present contract value being greater than not only the previous year's contract value minus the rider fee, but also the "high water mark"—namely, the previously highest contract value minus the rider fee at each contract anniversary. For example, once a relevant life starts to take withdrawals, he will not benefit from an increase in the contract value in any given year unless that increase results in a present contract value that is greater than the previously highest contract value minus the rider fee at each contract anniversary. In that case, such previously highest contract value minus the rider fee at each contract anniversary is most likely from a contract anniversary date which was prior to the time when the relevant life began taking withdrawals.

Having thus described the invention in rather full detail, it will be understood that such detail need not be strictly adhered to, but that additional changes and modifications may suggest themselves to one skilled in the art, all falling within the scope of the invention as defined by the subjoined claims.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A data processing system for processing data associated with a deferred variable annuity contract during the accumulation phase, including data indicative of a payment base value, a withdrawal percent value, and a contract value, and data indicative of a formula, for determining an amount of benefit payments available on a periodic basis in accordance with a guarantee, based on multiplying the payment base value by the withdrawal percent value, said system comprising:

a storage device storing data relating to the annuity contract, the stored data comprising data indicative of a present payment base value, a present contract value, a percentage maximum increase in the payment base value and the withdrawal percent value;

a processor in communication with the storage device, the processor configured to:

compare the present contract value to a present payment base value;

responsive to determining that the present contract value is greater than the present payment base value, determine a stepped-up payment base value, the stepped-up payment base value being a lesser of the present contract value and the present payment base value increased by the percentage maximum increase and greater than the present payment base value;

store data indicative of the stepped-up payment base value in the storage device; and determine a benefit payment amount available for withdrawal without reducing the payment base value by multiplying the stepped-up payment base value by the withdrawal percent value.

2. The data processing system of claim 1, wherein the processor is further configured to provide an output signal having data indicative of the stepped-up payment base value.

3. The data processing system of claim 1, further comprising, in communication with the processor, a payment module for making a benefit payment to a relevant life.

4. The data processing system of claim 3, wherein the processor is further configured to, responsive to receipt of data indicative of a request for withdrawal from the relevant life, provide an output signal to the payment module having data indicative of an amount of a benefit payment.

5. The data processing system of claim 1, wherein the processor is further configured to provide an output signal having data indicative of instructions to communicate the stepped-up payment base value to a relevant life.

6. The data processing system of claim 1, wherein the processor is further configured to store data indicative of the determined benefit payment amount available associated with data indicative of a one year period.

7. The data processing system of claim 1, wherein the storage device further stores data indicative of availability of the benefit payment to a relevant life for the lifetime of the relevant life.

8. A computer-implemented method for processing data associated with a deferred variable annuity contract during the accumulation phase, the data including data indicative of a contract value, a payment base value, and a withdrawal percent value, and data indicative of a formula, based on multiplying the payment base value by the withdrawal percent value, for determining an amount of a guarantee of periodically available benefit payments, comprising:

accessing by a processor from a data storage device data relating to the annuity contract, the accessed data comprising a present payment base value, a present contract value, a percentage maximum increase in the payment base value and the withdrawal percent value;

comparing by the processor the present contract value to the present payment base value;

responsive to determining that the present contract value is greater than the present payment base value, determining by the processor a stepped-up payment base value, the stepped-up payment base value being a lesser of the present contract value and the present payment base value increased by the percentage maximum increase and greater than the present payment base value; and storing by the processor data indicative of the stepped-up payment base value in the data storage device.

9. The computer-implemented method of claim 8, further comprising determining by the processor a benefit payment amount available for withdrawal during a period without reducing the payment base value by multiplying the stepped-up payment base value by the withdrawal percent value.

10. The computer-implemented method of claim 8, further comprising providing by the processor an output signal including data indicative of the stepped-up payment base value, and communicating the stepped-up payment base value to a relevant life.

11. The computer-implemented method of claim 8, further comprising making a payment to a relevant life responsive to receipt of a request from the relevant life for a payment.

12. The computer-implemented method of claim 11, further comprising comparing an amount of the payment to a product of the stepped-up payment base value and the withdrawal percent value, and, responsive to determining that the amount of the payment is greater than the product of the stepped-up payment base value and the withdrawal percent value, determining a reduced payment base value.

13. A tangible computer-readable medium having processor-executable instructions stored thereon, which instructions, when executed by a processor, cause the processor to:

access from a data storage device data associated with an annuity contract, the accessed data comprising a present payment base value, a present contract value, a percentage maximum increase in the payment base value and a withdrawal percent value;

compare the present contract value to the present payment base value;

responsive to determining that the present contract value is greater than the present payment base, determine a stepped-up payment base value, the stepped-up payment base value being a lesser of the present contract value and the present payment base value increased by a predetermined maximum step up percentage and greater than the present payment base value;

determine a benefit payment amount available for withdrawal without reducing the payment base value by multiplying the stepped-up payment base value by the withdrawal percent value; and store data indicative of the stepped-up payment base value and the determined benefit payment amount in the data storage device.

14. The tangible computer-readable medium of claim 13, wherein the instructions further cause the processor to, responsive to determining that the present contract value is not greater than the present payment base value, provide an output signal having data indicative that the payment base value is not stepped up.

15. The tangible computer-readable medium of claim 13, wherein the instructions further cause the processor to, responsive to receipt of data indicative of a request for a withdrawal from a relevant life, provide an output signal to a payment module having data indicative of a direction to effect payment to the relevant life.

16. The tangible computer-readable medium of claim 15, wherein the instructions further cause the processor to, responsive to receipt of the data indicative of the request for the withdrawal from the relevant life, determine a total of withdrawals during a current period, compare the total to the determined benefit payment amount and, responsive to determining that the total is greater than the determined benefit payment amount, determine a reduced payment base value.

17. The tangible computer-readable medium of claim 15, wherein the instructions further cause the processor to, responsive to receipt of the data indicative of the request for the withdrawal from the relevant life, determine a total of withdrawals during a current period, compare the total to the determined benefit payment amount and, responsive to determining that the total is not greater than the determined benefit payment amount, provide an output signal having data indicative of instructions to communicate to the relevant life that the withdrawal is made without reduction of the payment base value.

18. The tangible computer-readable medium of claim 13, wherein the instructions further cause the processor to provide an output signal having data indicative of instructions to communicate the stepped-up payment base value and the determined benefit payment amount to a relevant life.

19. The tangible computer-readable medium of claim 13, wherein the instructions further cause the processor to provide an output signal having data indicative that the determined benefit payment amount is an amount available for withdrawal during a year period during an accumulation phase of the annuity contract without reduction of the payment base value.

20. The tangible computer-readable medium of claim 13, wherein the instructions further cause the processor to provide an output signal having data indicative of a guarantee of annual benefit payments up to the determined benefit payment amount for a lifetime of a relevant life.

* * * * *